(12) United States Patent
Fukase

(10) Patent No.: US 10,326,916 B2
(45) Date of Patent: Jun. 18, 2019

(54) INSPECTION APPARATUS, INSPECTION METHOD AND STORAGE MEDIUM

(71) Applicant: Takahiro Fukase, Kanagawa (JP)

(72) Inventor: Takahiro Fukase, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/889,395

(22) Filed: Feb. 6, 2018

(65) Prior Publication Data

US 2018/0227463 A1 Aug. 9, 2018

(30) Foreign Application Priority Data

Feb. 7, 2017 (JP) ................................ 2017-020524

(51) Int. Cl.
*H04N 1/00* (2006.01)
*H04N 1/60* (2006.01)

(52) U.S. Cl.
CPC ....... *H04N 1/6097* (2013.01); *H04N 1/00806* (2013.01); *H04N 1/6033* (2013.01); *H04N 1/6036* (2013.01); *H04N 1/6072* (2013.01); *H04N 2201/0005* (2013.01); *H04N 2201/0082* (2013.01); *H04N 2201/0094* (2013.01)

(58) Field of Classification Search
None
See application file for complete search history.

(56) References Cited

U.S. PATENT DOCUMENTS

| | | | | |
|---|---|---|---|---|
| 8,150,106 B2* | 4/2012 | Wu | ................... | B41J 29/393 |
| | | | | 358/504 |
| 9,064,297 B2* | 6/2015 | Kaneko | ................... | G06T 7/0002 |
| 9,310,737 B2* | 4/2016 | Kojima | ................... | G03G 15/36 |
| 9,704,236 B2* | 7/2017 | Kogan | ................... | H04N 1/56 |
| 2006/0158672 A1* | 7/2006 | Kondo | ................... | H04N 1/6055 |
| | | | | 358/1.9 |
| 2007/0291312 A1* | 12/2007 | Kaneko | ................... | H04N 1/6033 |
| | | | | 358/2.1 |
| 2008/0137914 A1* | 6/2008 | Minhas | ................... | G06T 7/001 |
| | | | | 382/112 |
| 2008/0304087 A1* | 12/2008 | Shin | ................... | G06T 5/009 |
| | | | | 358/1.6 |

(Continued)

FOREIGN PATENT DOCUMENTS

JP 2015-141093 8/2015

*Primary Examiner* — Miya J Williams
(74) *Attorney, Agent, or Firm* — Oblon, McClelland, Maier & Neustadt, L.L.P.

(57) ABSTRACT

An inspection apparatus includes circuitry to acquire a first scanned image by scanning each recording media printed with a target image, acquire a second scanned image by scanning one recording medium printed with a color chart including a plurality of color patches, generate index color information including information of index colors having higher frequency of occurrence on the one recording medium for each of the color patches, generate color conversion information by associating each of the color patches and each of the index colors, generate a reference image for each of the index colors by performing a color conversion of the target image by applying the color conversion information, calculate a difference of a color value of each pixel configuring the first scanned image and a color value of each pixel of each of reference images, and inspect the printed matter based on a plurality of color difference values.

9 Claims, 12 Drawing Sheets

(56) References Cited

U.S. PATENT DOCUMENTS

2016/0114607 A1\* 4/2016 Yamagishi ........... H04N 1/6033
                                                                    347/19
2016/0248942 A1\* 8/2016 Horita .................. H04N 1/6019

\* cited by examiner

INDEX COLOR INFORMATION

| COLOR | R | G | B |
|---|---|---|---|
| D | 180 | 190 | 184 |
| E | 216 | 216 | 160 |
| F | 217 | 215 | 220 |

FIG. 7

COLOR CONVERSION INFORMATION

| C | M | Y | K | R | G | B |
|---|---|---|---|---|---|---|
| 0 | 0 | 0 | 0 | 180 | 190 | 184 |
| 0 | 0 | 0 | 1 | 178 | 189 | 183 |
| ... | ... | ... | ... | ... | ... | ... |
| 255 | 255 | 255 | 255 | 1 | 3 | 2 |

FIG. 8

| COLOR | R | G | B |
|---|---|---|---|
| COLOR VALUE OF PIXEL "P" | 218 | 215 | 161 |

FIG. 9

DIFFERENCE OF COLOR VALUE

|  | R | G | B | S |
|---|---|---|---|---|
| DIFFERENCE WITH COLOR "D" | 38 | 25 | −23 | 86 |
| DIFFERENCE WITH COLOR "E" | 2 | −1 | 1 | 4 |
| DIFFERENCE WITH COLOR "F" | 1 | 0 | −59 | 60 |

FIG. 10

| COLOR | R | G | B |
|---|---|---|---|
| COLOR VALUE OF PIXEL "Q" | 65 | 200 | 159 |

DIFFERENCE OF COLOR VALUE

|  | R | G | B | S |
|---|---|---|---|---|
| DIFFERENCE WITH COLOR "D" | −115 | 25 | −25 | 165 |
| DIFFERENCE WITH COLOR "E" | −151 | 16 | −1 | 168 |
| DIFFERENCE WITH COLOR "F" | −152 | 15 | −61 | 228 |

COLOR CONVERSION INFORMATION

| C | M | Y | K | COLOR D | | | COLOR E | | | COLOR F | | |
|---|---|---|---|---|---|---|---|---|---|---|---|---|
| | | | | R | G | B | R | G | B | R | G | B |
| 0 | 0 | 0 | 0 | 180 | 190 | 184 | 216 | 216 | 160 | 217 | 215 | 220 |
| 0 | 0 | 0 | 1 | 180 | 190 | 183 | 200 | 210 | 159 | 198 | 213 | 218 |
| ... | ... | ... | ... | ... | ... | ... | ... | ... | ... | ... | ... | ... |

INSPECTION APPARATUS, INSPECTION METHOD AND STORAGE MEDIUM

CROSS-REFERENCE TO RELATED APPLICATION

This application claims priority pursuant to 35 U.S.C. § 119(a) to Japanese Patent Application No. 2017-020524, filed on Feb. 7, 2017 in the Japan Patent Office, the disclosure of which is incorporated by reference herein in its entirety.

BACKGROUND

Technical Field

This disclosure relates to an inspection apparatus, an inspection method, and storage medium.

Background Art

Printing operations in production printing require the quality inspection for printed matters to achieve higher quality of the printed matters. For example, an inspection apparatus detects defects existing on a printed matter by comparing a reference image, which is a standard for inspecting the printed matter, and a scanned image generated by optically scanning the printed matter, and inspects quality of the printed matter based on a level of the detected defects.

In this inspection apparatus, the reference image is generated based on an assumption that a surface pattern of recording media used for forming images thereon as the printed matters (e.g. sheets used for printing images) is same for every one of sheets used as the recording media such as every one of sheets used as the recording media have a plain face.

However, when the recording media have a surface pattern such as a surface appearance pattern and concave/convex pattern, the surface appearance pattern and the concave/convex pattern may not be exactly same for every one of sheets used as the recording media.

Therefore, when such recording media are used for forming the printed matters, the surface pattern of the recording media used for forming the printed matters may differ for every one of sheets. In this case, the above described assumption cannot be applied to the generated reference image, and the surface pattern of the recording media cannot be reproduced correctly for the generated reference image, with which the printed image inspection accuracy decreases.

SUMMARY

As one aspect of the present invention, an inspection apparatus is devised. The inspection apparatus includes circuitry to acquire a first scanned image by scanning each recording media printed with a target image as a printed matter using a scanner, the printed matter including a drawing region where the target image is drawn, and a non-drawing region where the target image is not drawn, acquire a second scanned image by scanning one recording medium printed with a color chart including a plurality of color patches using the scanner without printing the target image on the one recording medium, the one recording medium and the each recording media having a similar property, generate index color information including information of a plurality of index colors having higher frequency of occurrence on the one recording medium for each of the plurality of color patches configuring the color chart printed on the one recording medium, generate color conversion information by associating a value of each of the plurality of color patches and a color value of each of the plurality of index colors included in the index color information, generate a reference image as an inspection standard for inspecting the printed matter for each of the plurality of index colors having higher frequency of occurrence by performing a color conversion of the target image by applying the color conversion information, the generated reference image including a plurality of reference images, calculate a difference of a color value of each one of pixels configuring the first scanned image and a color value of each one of pixels of each of the plurality of reference images, corresponding to each one of the pixels configuring the first scanned image, as a color difference value of each one of the pixels configuring the first scanned image, the calculated color difference value includes a plurality of color difference values, and inspect the printed matter based on the plurality of color difference values calculated for the pixels configuring the first scanned image.

As another aspect of the present invention, a method of inspecting a printed matter is devised. The method includes acquiring a first scanned image by scanning each recording media printed with a target image as a printed matter using a scanner, the printed matter including a drawing region where the target image is drawn, and a non-drawing region where the target image is not drawn, acquiring a second scanned image by scanning one recording medium printed with a color chart including a plurality of color patches using the scanner without printing the target image on the one recording medium, the one recording medium and the each recording media having a similar property, generating index color information including information of a plurality of index colors having higher frequency of occurrence on the one recording medium for each of the plurality of color patches configuring the color chart printed on the one recording medium, generating color conversion information by associating a value of each of the plurality of color patches and a color value of each of the plurality of index colors included in the index color information, generating a reference image as an inspection standard for inspecting the printed matter for each of the plurality of index colors having higher frequency of occurrence by performing a color conversion of the target image by applying the color conversion information, the generated reference image including a plurality of reference images, calculating a difference of a color value of each one of pixels configuring the first scanned image and a color value of each one of pixels of each of the plurality of reference images, corresponding to each one of the pixels configuring the first scanned image, as a color difference value of each one of the pixels configuring the first scanned image, the calculated color difference value includes a plurality of color difference values, and inspecting the printed matter based on the plurality of color difference values calculated for the pixels configuring the first scanned image.

As another aspect of the present invention, a non-transitory storage medium storing one or more instructions that, when executed by one or more processors, cause the one or more processors to execute a method of inspecting a printed matter is devised. The method includes acquiring a first scanned image by scanning each recording media printed with a target image as a printed matter using a scanner, the printed matter including a drawing region where the target image is drawn, and a non-drawing region where the target image is not drawn, acquiring a second scanned image by scanning one recording medium printed with a color chart including a plurality of color patches using the scanner without printing the target image on the one recording medium, the one recording medium and the each recording media having a similar property, generating index color information including information of a plurality of index colors having higher frequency of occurrence on the one recording medium for each of the plurality of color patches configuring the color chart printed on the one recording medium, generating color conversion information by associating a value of each of the plurality of color patches and a color value of each of the plurality of index colors included in the index color information, generating a reference image as an inspection standard for inspecting the printed matter for each of the plurality of index colors having higher frequency of occurrence by performing a color conversion of the target image by applying the color conversion information, the generated reference image including a plurality of reference images, calculating a difference of a color value of each one of pixels configuring the first scanned image and a color value of each one of pixels of each of the plurality of reference images, corresponding to each one of the pixels configuring the first scanned image, as a color difference value of each one of the pixels configuring the first scanned image, the calculated color difference value includes a plurality of color difference values, and inspecting the printed matter based on the plurality of color difference values calculated for the pixels configuring the first scanned image.

BRIEF DESCRIPTION OF THE DRAWINGS

A more complete appreciation of the description and many of the attendant advantages and features thereof can be readily obtained and understood from the following detailed description with reference to the accompanying drawings, wherein:

FIG. 7 illustrates an example of color conversion information of the first embodiment;

FIG. 8 illustrates an example of color value of a pixel configuring a non-drawing region on a first scanned image of the first embodiment;

FIG. 9 illustrates an example of a difference of a color value of the index color information indicated in FIG. 6 and a color value of a pixel indicated in FIG. 8;

FIG. 10 illustrates another example of color value of a pixel configuring a non-drawing region on a first scanned image of the first embodiment;

Figure 1:
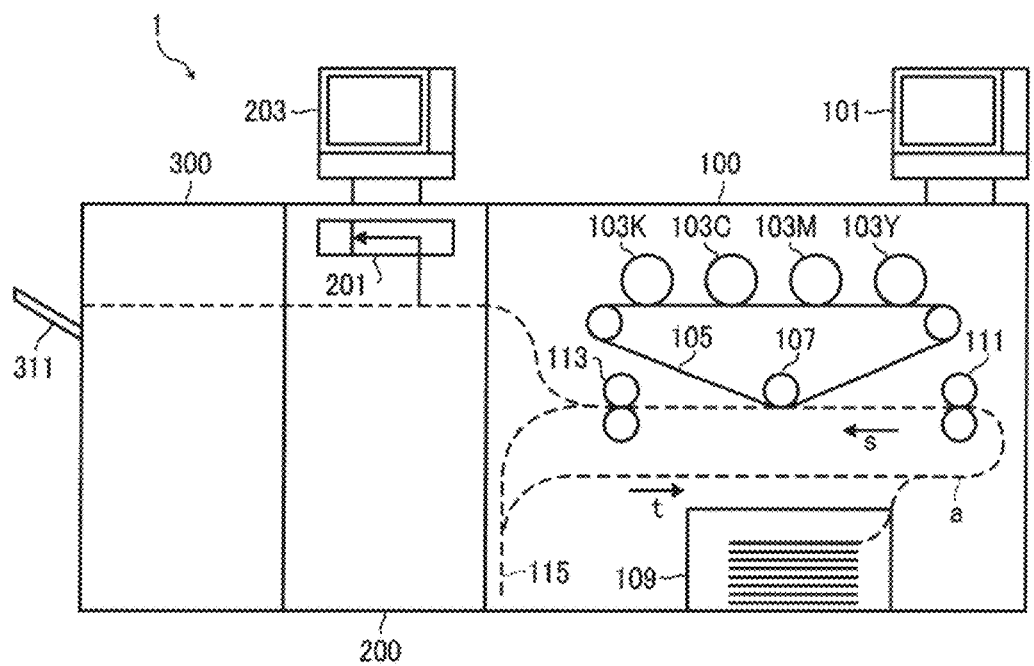
FIG. 1 illustrates an example of a schematic configuration of a printing inspection system of a first embodiment.

The accompanying drawings are intended to depict exemplary embodiments of the present invention and should not be interpreted to limit the scope thereof. The accompanying drawings are not to be considered as drawn to scale unless explicitly noted, and identical or similar reference numerals designate identical or similar components throughout the several views.

DETAILED DESCRIPTION

A description is now given of exemplary embodiments of present disclosure. It should be noted that although such terms as first, second, etc. may be used herein to describe various elements, components, regions, layers and/or sections, it should be understood that such elements, components, regions, layers and/or sections are not limited thereby because such terms are relative, that is, used only to distinguish one element, component, region, layer or section from another region, layer or section. Thus, for example, a first element, component, region, layer or section discussed below could be termed a second element, component, region, layer or section without departing from the teachings of present disclosure.

In addition, it should be noted that the terminology used herein is for the purpose of describing particular embodiments only and is not intended to be limiting of present disclosure. Thus, for example, as used herein, the singular forms "a", "an" and "the" are intended to include the plural forms as well, unless the context clearly indicates otherwise. Moreover, the terms "includes" and/or "including", when used in this specification, specify the presence of stated features, integers, steps, operations, elements, and/or components, but do not preclude the presence or addition of one or more other features, integers, steps, operations, elements, components, and/or groups thereof. Furthermore, although in describing views illustrated in the drawings, specific terminology is employed for the sake of clarity, the present disclosure is not limited to the specific terminology so selected and it is to be understood that each specific element includes all technical equivalents that operate in a similar manner and achieve a similar result. Referring now to the drawings, one or more apparatuses or systems according to one or more embodiments are described hereinafter.

Hereinafter, a description is given of an inspection apparatus, an inspection method, and a storage medium of one or more embodiments of the present invention with reference to the accompanying drawings.

First Embodiment

FIG. 1 illustrates an example of a schematic configuration of a printing inspection system 1 of a first embodiment. As illustrated in FIG. 1, the print inspection system 1 includes, for example, a printing apparatus 100, a print inspection apparatus 200, and a stacker 300, in which the print inspection apparatus 200 is used as one example of inspection apparatuses.

As illustrated in FIG. 1, the printing apparatus 100 includes, for example, an operation panel 101, photoconductor drums 103Y, 103M, 103C, 103K, a transfer belt 105, a secondary transfer roller 107, a sheet feed unit 109, a conveyance roller pair 111, a fixing roller 113, and an inverting path mechanism 115.

The operation panel 101 is an operation/display unit used for inputting various operations to the printing apparatus 100 and displaying various screens.

A toner image is formed on each of the photoconductor drums 103Y, 103M, 103C, 103K by performing an image forming process including a charging process, an exposure process, a development process, a transfer process, and a cleaning process, and then the toner image formed on each of the photoconductor drums 103Y, 103M, 103C, 103K is transferred onto the transfer belt 105. As to the first embodiment, a yellow toner image is formed on the photoconductor drum 103Y, a magenta toner image is formed on the photoconductor drum 103M, a cyan toner image is formed on the photoconductor drum 103C, and a black toner image is formed on the photoconductor drum 103K, but not limited thereto.

The transfer belt 105 transports the toner images such as a full-color toner images transferred from the photoconductor drums 103Y, 103M, 103C, and 103K to a secondary transfer position facing the secondary transfer roller 107. As to the first embodiment, the yellow toner image is transferred onto the transfer belt 105 at first, and then the magenta toner image, the cyan toner image, and the black toner image are sequentially superposed and transferred onto the transfer belt 105, but not limited thereto.

The sheet feed unit 109 stores a plurality of recording media by stacking the plurality of recording media, and feeds the recording media one by one. The recording medium is, for example, recording sheets such as paper, but not limited thereto. For example, the recording medium can be coated paper, thick paper, overhead projector (OHP) sheet, plastic film, prepreg and copper foil that can record images thereon.

As to the first embodiment, it is assumed that the sheet feed unit 109 stores a plurality of recording media such as recording sheets (e.g., paper) having a substantially similar surface pattern one another. For example, the sheet feed unit 109 stores a plurality of recording sheets having a surface pattern illustrated in FIG. 2. In this disclosure, it is assumed that each one of the recording sheets stored in the sheet feed unit 109 has the surface pattern illustrated in FIG. 2, but the surface pattern of each one of the recording sheets may not be exactly the same, but the surface pattern of each one of the recording sheets may vary for each one of the recording sheets such as a shape and an arrangement of the surface pattern may vary for each one of the recording sheets. Typically, recording sheets used for production printing may have a given surface pattern such as a given graphical pattern composed of colors, shapes or the like based on demands of end users, and such recording sheets are manufactured to have a substantially same surface pattern one another, but the surface condition may vary for each one of the recording sheets due to some reasons.

As to the first embodiment, as described above, it is assumed that the sheet feed unit 109 stores the plurality of recording media having the substantially similar surface pattern such as similar surface appearance pattern, but not limited thereto. For example, a plurality of recording media (e.g., recording sheets) having a substantially similar concave/convex pattern can be stored in the sheet feed unit 109. In this case, it is also assumed that the concave/convex pattern may vary for each one of the recording sheets, which means a shape and arrangement of the concave/convex pattern vary for each one of the recording sheets. In this disclosure, the surface pattern may mean the surface appearance pattern and the concave/convex pattern, but not limited thereto.

The conveyance roller pair 111 conveys the recording medium fed from the sheet feed unit 109 along a conveying path "a" in a direction of an arrow "s."

The secondary transfer roller 107 collectively transfers the full-color toner images transported by the transfer belt 105 onto the recording medium conveyed by the conveyance roller pair 111 at the secondary transfer position.

The fixing roller 113 heats and pressurizes the recording medium transferred with the full-color toner images to fix the full-color toner images on the recording medium.

In a case of single-sided printing, the printing apparatus 100 ejects a printed matter, which is the recording medium fixed with the full-color toner images, to the print inspection apparatus 200. By contrast, in a case of double-sided printing, the recording medium fixed with the full-color toner image is transported to the inverting path mechanism 115 in the printing apparatus 100.

The inverting path mechanism 115 reverses the front surface and the back surface of the recording medium by switching back the recording medium, and transports the recording medium in the direction of an arrow "t." The recording medium transported by the inverting path mechanism 115 is then transported by the conveyance roller pair 111 again, and then a full-color toner image is transferred onto the back surface of the recording medium by the secondary transfer roller 107, and the full-color toner image are fixed on the back surface of the recording medium by the fixing roller 113, and then the recording medium is ejected to the print inspection apparatus 200 as the printed matter.

As illustrated in FIG. 1, the print inspection apparatus 200 includes, for example, a scanner 201, and an operation panel 203.

The operation panel 203 is an operation/display unit used for inputting various operations to the print inspection apparatus 200, and displaying various screens. Further, the operation panel 203 can be omitted. When the operation panel 203 is omitted, the operation panel 101 can also serve the function of the operation panel 203, or an externally connected personal computer (PC) can serve the function of the operation panel 203.

The scanner 201 optically scans one face of the printed matter ejected from the printing apparatus 100 to generate an electrical signal.

The print inspection apparatus 200 ejects the scanned printed matter to the stacker 300. The print inspection apparatus 200 can further include another scanner that optically scans the other face of the printed matter.

The stacker 300 includes, for example, a tray 311. The stacker 300 stacks the printed matter ejected from the print inspection apparatus 200 onto the tray 311.

Figure 3:
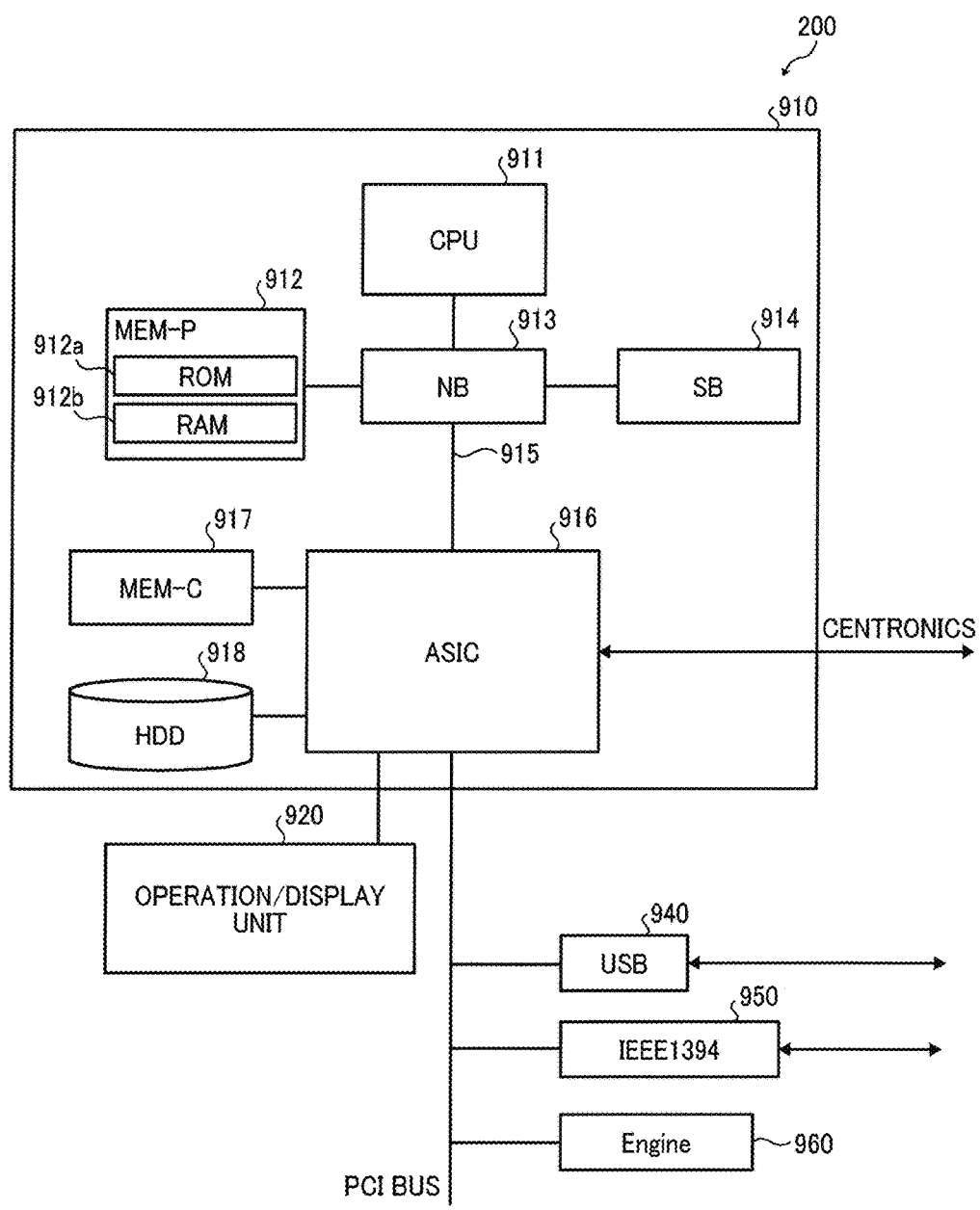
FIG. 3 illustrates an example of a hardware block diagram of a print inspection apparatus of the first embodiment.

FIG. 3 illustrates an example of a hardware block diagram of the print inspection apparatus 200 of the first embodiment. As illustrated in FIG. 3, the print inspection apparatus 200 includes, for example, a controller 910, and an engine 960 connected with each other by a peripheral component interconnect (PCI) bus. The controller 910 controls the print inspection apparatus 200 entirely. For example, the controller 910 controls drawing, communication, and an input from an operation/display unit 920. The engine 960 is an engine connectable to a PCI bus. For example, the engine 960 includes a scanner engine for a scanner. Further, in addition to an engine unit, the engine 960 includes an image processing unit that performs error diffusion and gamma conversion.

The controller 910 includes, for example, a central processing unit (CPU) 911, a north bridge (NB) 913, a system memory (MEM-P) 912, a south bridge (SB) 914, a local memory (MEM-C) 917, an application specific integrated circuit (ASIC) 916, and a hard disk drive (HDD) 918, in which the north bridge (NB) 913 and the ASIC 916 are connected with each other by an accelerated graphics port (AGP) bus 915. Further, the MEM-P 912 includes, for example, a read only memory (ROM) 912a, and a random access memory (RAM) 912b.

The CPU 911 controls the print inspection apparatus 200 entirely. The CPU 911 is used with, for example, a chip set having the NB 913, the MEM-P 912 and the SB 914, and the CPU 911 is connected to other devices or apparatuses via the chip set.

The NB 913 is used as a bridge to connect the CPU 911 and the MEM-P 912, the CPU 911 and the SB 914, and the CPU 911 and the AGP bus 915. The NB 913 includes, for example, a memory controller that controls the reading and writing data to MEM-P 912, a PCI master, and an AGP target.

The MEM-P 912 is a system memory used as a memory for storing programs and data, a memory for loading programs and data, and a drawing memory for a printer. The MEM-P 912 includes the ROM 912a and the RAM 912b. The ROM 912a is a read-only memory used as a memory for storing programs and data. The RAM 912b is used as a memory for loading programs and data, and a drawing memory for a printer where programs and data can be written and read.

The SB 914 is used as a bridge for connecting the NB 913 to PCI devices and peripheral devices. The SB 914 is connected to the NB 913 via a PCI bus, and the PCI bus is also connected to a network interface (I/F) unit.

The ASIC 916 is an integrated circuit (IC) used for image processing having an a hardware element for image processing, and the ASIC 916 has a role of a bridge connecting the AGP bus 915, the PCI bus, the HDD 918, and the MEM-C 917. The ASIC 916 includes a PCI target and an AGP master, an arbiter (ARB) used as the core of the ASIC 916, a memory controller for controlling the MEM-C 917, a plurality of direct memory access controllers (DMACs) for performing rotation of image data or the like by a hardware logic or the like, and a PCI unit for performing data transfer with the engine 960 via a PCI bus. The ASIC 916 is connected to a universal serial bus (USB) 940, and an Institute of Electrical and Electronics Engineers (IEEE) 1394 interface 950 via a PCI bus. The operation/display unit 920 is connected to the ASIC 916 directly.

The MEM-C 917 is a local memory used as a copy image buffer and a code buffer. The HDD 918 is a storage for accumulating or storing image data, programs, font data, and forms or the like.

The AGP bus 915 is a bus interface for a graphics accelerator card proposed for enhancing a graphics processing speed, and the AGP bus 915 accesses the MEM-P 912 directly with high throughput to enhance the processing speed of the graphics accelerator card speed.

Figure 4:
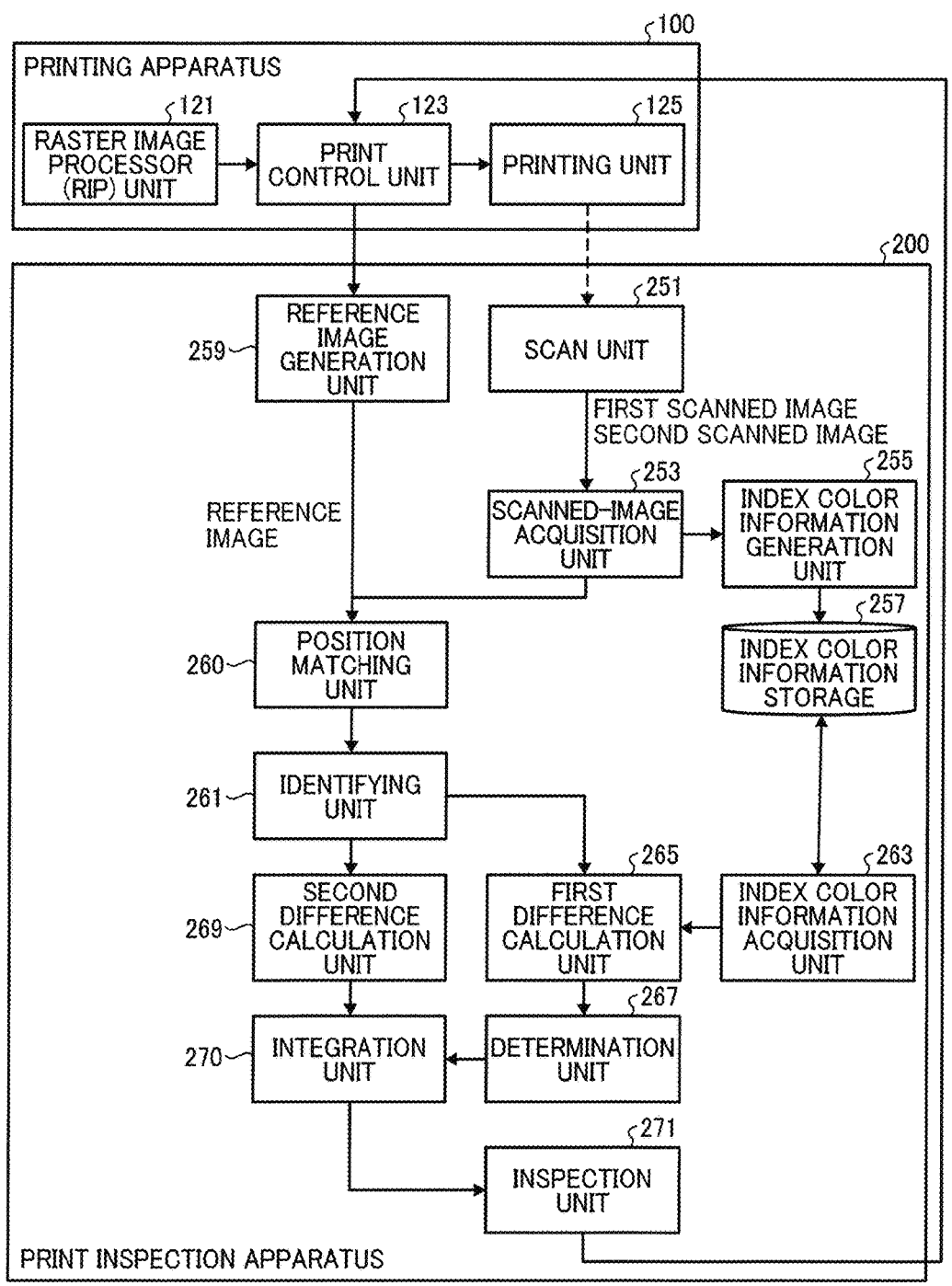
FIG. 4 illustrates an example of a functional block diagram of a printing apparatus and a print inspection apparatus of the first embodiment.

FIG. 4 illustrates an example of a functional block diagram of the printing apparatus 100 and the print inspection apparatus 200 of the first embodiment. As illustrated in FIG. 4, the printing apparatus 100 includes, for example, a raster image processor (RIP) unit 121, a print control unit 123, and a printing unit 125.

As illustrated in FIG. 4, the print inspection apparatus 200 includes, for example, a scan unit 251, a scanned-image acquisition unit 253, an index color information generation unit 255, an index color information storage 257, a reference image generation unit 259, a position matching unit 260, an identifying unit 261, an index color information acquisition unit 263, a first difference calculation unit 265, a determination unit 267, a second difference calculation unit 269, an integration unit 270, and an inspection unit 271.

As to the first embodiment, it is assumed that the printing apparatus 100 includes the RIP unit 121, but not limited thereto. For example, an apparatus such as a digital front end (DFE), different from the printing apparatus 100, can include the RIP unit 121.

As to the first embodiment, it is assumed that the printing apparatus 100 and the print inspection apparatus 200 are connected with each other by a local interface such as a universal serial bus (USB) and a peripheral component interconnect express (PCIe), but the connection between the printing apparatus 100 and the print inspection apparatus 200 is not limited thereto.

The RIP unit 121 and the print control unit 123 can be implemented by, for example, a CPU and a memory. The printing unit 125 is implemented by, for example, the photoconductor drums 103Y, 103M, 103C, 103K, the transfer belt 105, the secondary transfer roller 107, and the fixing roller 113, but not limited thereto. As to the first embodiment, images are printed using by the electrophotography method, but images can be printed by using any methods such as the inkjet method.

The scan unit 251 corresponds to the scanner 201 (FIG. 1), and can be implemented by, for example, by using the engine 960.

The scanned-image acquisition unit 253, the index color information generation unit 255, the reference image generation unit 259, the position matching unit 260, and the index color information acquisition unit 263 can be implemented by, for example, the CPU 911 and the system memory 912.

The identifying unit 261, the first difference calculation unit 265, the determination unit 267, the second difference calculation unit 269, the integration unit 270, and the inspection unit 271 can be implemented by, for example, the CPU 911 and the system memory 912, or can be implemented by the ASIC 916, or can be implemented by a combination of the CPU 911 and the system memory 912, and the ASIC 916.

The index color information storage 257 can be implemented by, for example, the HDD 918.

Hereinafter, a description is given of operations of the printing apparatus 100 and the print inspection apparatus 200, in which an index color information generation operation that generates index color information is described at first, and then an inspection operation that inspects quality of the printed matter is described.

At first, a description is given of the index color information generation operation that generates the index color information.

The scan unit 251 scans a recording medium used for generating index color information to generate a second scanned image. The recording medium used for generating index color information may be referred to as an index information generation recording medium in this description. The index information generation recording medium used for generating the index color information has a substantially similar property of recording media used for printing images thereon, but the index information generation recording medium is not printed with an image. Therefore, as to the first embodiment, the index information generation recording medium is, for example, a recording sheet (e.g., paper) having the surface pattern illustrated in FIG. 2, and not printed with an image thereon. In this description, it is assumed that the second scanned image is generated by scanning at least one of the recording media to be used for a printing operation without printing an image.

As to the first embodiment, a recording medium, which is not printed with an image thereon and ejected from the printing apparatus 100, is scanned by the scan unit 251 as the recording medium used for generating the index color information to generate the second scanned image. As to the first embodiment, it is assumed that the second scanned image is configured with a plurality of pixels, in which each pixel represents image data of red, green or blue (RGB) having an image resolution of 200 dot per inch (dpi), and each pixel of the image data is defined by eight-bit information, but the image configuration of the second scanned image is not limited thereto.

The scanned-image acquisition unit 253 acquires the second scanned image generated by the scan unit 251.

The index color information generation unit 255 analyzes the second scanned image acquired by the scanned-image acquisition unit 253 to generate the index color information indicating information of a plurality of index colors that are detected with higher frequency of occurrence on the recording medium, and registers the generated index color information in the index color information storage 257. Hereinafter, the index color information may be referred to as the index color information including information of a plurality of index colors having higher frequency of occurrence on the index information generation recording medium.

Figures 5, 6:
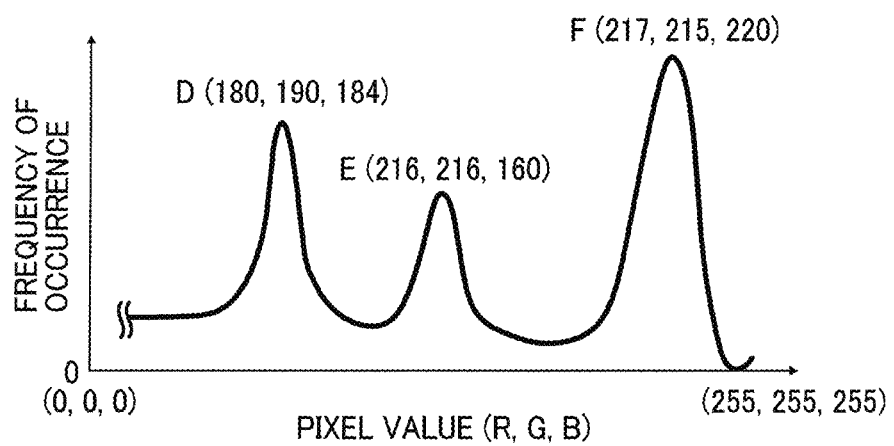
FIG. 5 illustrates an example of color profile indicating a distribution of frequency of occurrence of each of colors on a recording medium of the first embodiment.
FIG. 6 illustrates an example of index color information of a recording medium of the first embodiment.

Specifically, the index color information generation unit 255 counts the frequency of occurrence of each of colors appearing on the second scanned image acquired by the scanned-image acquisition unit 253 by counting the number of pixels corresponding to each of the colors appearing on the second scanned image, and generates a color profile plotting the counted frequency of occurrence of each of the colors in an entire color range that can appear on the second scanned image, in which the entire color range can be expressed by a red, green and blue (RGB) color space. As illustrated in FIG. 5, since the color profile includes one or more colors having a local maximum frequency of occurrence, the index color information generation unit 255 can generate the index color information including information of a plurality of colors having higher frequency of occurrence on the index information generation recording medium.

FIG. 5 illustrates an example of the color profile plotting the frequency of occurrence of each of the colors on the recording medium in the first embodiment. In an example of FIG. 5, the horizontal axis indicates a pixel value of each of the colors expressed by RGB color channels setting the entire color range of (R, G, B)=(0, 0, 0) to (255, 255, 255), and the vertical axis indicates the frequency of occurrence of each of the colors in the second scanned image.

In the color profile illustrated in FIG. 5, three colors take peaks (i.e., local maximums) such as color "D" expressed by (R, G, B)=(180, 190, 184), color "E" expressed by (R, G, B)=(216, 216, 160), and color "F" expressed by (R, G, B)=(217, 215, 220) become the peaks (i.e., local maximums). Therefore, the index color information includes colors "D, E and F" as three index colors on the recording medium as illustrated in FIG. 6. Specifically, the index color information includes an identification value and a pixel value of each of the three index colors.

Further, each of the plurality of index colors (e.g., colors D, E, F) included in the index color information can be expressed by a value of one or more color channels. As to the first embodiment, since the second scanned image used for generating the index color information is configured with RGB image data, each of the plurality of index colors (e.g., color D, E, F) included in the index color information is expressed by a value of each of RGB color channels as illustrated in FIG. 6.

Hereinafter, a description is given of the inspection operation of the first embodiment.

When the RIP unit 121 receives target print data from an external apparatus such as a host apparatus, the RIP unit 121 performs the RIP processing on the received target print data, and generates a RIP image as a target drawing image or target image. As to the first embodiment, the target print data includes, for example, data described by page description language (PDL) such as PostScript (registered trademark) and image data defined by tagged image file format (TIFF), but not limited thereto.

Further, as to the first embodiment, the RIP image is RIP image data expressed by cyan, magenta, yellow, and black (CMYK) color, and it is assumed that the RIP image data has an image resolution of 1,200 dot per inch (dpi) and each pixel of the image data is defined by one-bit information, but not limited thereto.

The print control unit 123 transmits the RIP image generated by the RIP unit 121 to the print inspection apparatus 200, and also to the printing unit 125.

Further, based on an inspection result transmitted from the print inspection apparatus 200 as feedback information to the print control unit 123, for example, the print control unit 123 instructs the stacker 300 to designate an ejection tray of a printed matter which did not pass the quality inspection, puts marking on the printed matter which did not pass the quality inspection, and instructs the printing unit 125 to perform a new printing operation to output a printed matter correctly.

The printing unit 125 executes a printing process such as an image forming process to print the RIP image on a recording medium, with which a printed matter, which is the recording medium printed with the target drawing image thereon, is generated.

The scan unit 251 scans the printed matter generated by the printing unit 125 to generate a first scanned image, in which the first scanned image is generated by scanning the recording medium printed with an image thereon. By contrast, as above described, the second scanned image is generated by scanning the recording medium without forming an image thereon. As to the first embodiment, it is assumed that the first scanned image is configured with a plurality of pixels, in which each pixel represents image data of any one of red, green or blue (RGB) having an image resolution of 200 dot per inch (dpi) and each pixel of the image data is defined by eight-bit information, but the configuration of the first scanned image is not limited thereto.

The scanned-image acquisition unit 253 acquires the first scanned image generated by the scan unit 251.

The reference image generation unit 259 acquires the RIP image transmitted from the printing apparatus 100 as the target drawing image, and generates a reference image (i.e., master image) based on the acquired RIP image, in which the reference image is used as an inspection standard for inspecting a drawing region on the printed matter where the target drawing image is drawn. Specifically, the reference image generation unit 259 performs a low-value to multi-value conversion processing, a resolution conversion processing, a region determination processing, and a color conversion processing on the acquired RIP image to generate the reference image.

In the low-value to multi-value conversion processing, the reference image generation unit 259 multiplies a value of "255" to each pixel of the RIP image data to convert the each pixel of the RIP image data from one-bit pixel to eight-bit pixel.

In the resolution conversion processing, the reference image generation unit 259 converts the image resolution of the RIP image, having applied with the low-value to multi-value conversion processing, from 1,200 dpi to 200 dpi.

In the region determination processing, the reference image generation unit 259 determines whether each one of the pixels configuring the RIP image, having applied with the resolution conversion processing, corresponds to a pixel configuring a region corresponding to a drawing region on a printed matter where the target drawing image is drawn (i.e., pixel configuring the target drawing image), or a pixel configuring a region corresponding to a non-drawing region on the printed matter where the target drawing image is not drawn (i.e., pixel not configuring the target drawing image).

For example, when a pixel value of a determination target pixel configuring the RIP image is (C, M, Y, K)=(0, 0, 0, 0), the reference image generation unit 259 determines that the determination target pixel is the pixel configuring the region corresponding to the non-drawing region, and when a pixel value of the determination target pixel configuring the RIP image is not (C, M, Y, K)=(0, 0, 0, 0), the reference image generation unit 259 determines that the determination target pixel is the pixel configuring the region corresponding to the drawing region. Then, based on the above determination result, the reference image generation unit 259 sets a first flag to the pixel determined as the pixel configuring the region corresponding to the drawing region, and a second flag to the pixel determined as the pixel configuring the region corresponding to the non-drawing region, in which the first flag indicates that the pixel configures the drawing region, and the second flag indicates that the pixel configures the non-drawing region.

In the color conversion processing, the reference image generation unit 259 converts a color space of the RIP image, having applied with the above described region determination processing, from the CMYK color space to the RGB color space.

Specifically, as illustrated in FIG. 7, a lookup table (LUT) associating colors expressed by the CMYK color space (i.e., each color is expressed by a combination of a value of each of CMYK color channels) and colors expressed by the RGB color space (i.e., each color is expressed by a combination of a value of each of RGB color channels) is generated as color conversion information. Then, the reference image generation unit 259 converts the RIP image, having applied with the region determination processing, from a color image configured with eight-bit pixels defined by the CMYK color space to a color image configured with eight-bit pixels defined by the RGB color space by applying the lookup table (LUT). Further, the color conversion information can be stored in, for example, the HDD 918.

By performing the above described processing, the reference image generation unit 259 generates the reference image configured with eight-bit pixels defined by the RGB color space and having the image resolution of 200 dpi from the RIP image configured with one-bit pixels defined by the CMYK space and having the image resolution of 1,200 dpi.

Further, since the reference image is generated by performing the above described processing, each one of the pixels configuring the reference image is set with a color, and each one of the pixels configuring the reference image is associated with information (i.e., flag) indicating whether each one of the pixels configuring the reference image is the pixel configuring the region corresponding to the drawing region on the printed matter or the pixel configuring the region corresponding to the non-drawing region on the printed matter.

However, the method of generating the reference image is not limited to the above method, and the processing and conversion values used for generating the reference image can be appropriately modified depending on the image format such as gradation, color space, and image resolution.

The position matching unit 260 extracts one or more feature points from the reference image generated by the reference image generation unit 259, identifies one or more points on the first scanned image acquired by the scanned-image acquisition unit 253 that correspond to the one or more feature points on the reference image, calculates a positional deviation amount between the one or more feature points on the reference image and the corresponding one or more points identified on the first scanned image, and then performs the position matching between the reference image and the first scanned image based on the calculated positional deviation amount.

The identifying unit 261 identifies a corresponding drawing region and a corresponding non-drawing region on the first scanned image acquired by the scanned-image acquisition unit 253 based a position matching result obtained by comparing the first scanned image and the reference image generated by the reference image generation unit 259. In this disclosure, the corresponding drawing region on the first scanned image means a region corresponding to the drawing region on the printed matter, and the corresponding non-drawing region on the first scanned image means a region corresponding to the non-drawing region on the printed matter.

Specifically, the identifying unit 261 identifies each one of pixels configuring the reference image that corresponds to each one of pixels configuring the first scanned image based on a position matching result obtained by the position matching unit 260.

Then, the identifying unit 261 refers the flag set for the pixel identified on the reference image to identify whether each one of the pixels configuring the first scanned image corresponds to the pixel configuring the drawing region on the printed matter or the pixel configuring the region corresponding to the non-drawing region on the printed matter. Specifically, since the first flag indicates that the pixel identified on the reference image configures the drawing region, the identifying unit 261 identifies the pixel on the first scanned image, corresponding to the pixel identified on the reference image set with the first flag, as the pixel configuring the corresponding drawing region, and further since the second flag indicates that the pixel identified on the reference image configures the non-drawing region, the identifying unit 261 identifies the pixel on the first scanned image, corresponding to the pixel identified on the reference image set with the second flag, as the pixel configuring the corresponding non-drawing region. With this configuration, the corresponding drawing region and the corresponding non-drawing region on the first scanned image can be identified.

The second difference calculation unit 269 calculates a difference of a color value of each one of the pixels configuring the corresponding drawing region on the first scanned image, and a color value of each one of the pixels on the reference image that corresponds to each one of the pixels configuring the corresponding drawing region on the first scanned image.

Specifically, the identifying unit 261 identifies each one of the pixels configuring the reference image that corresponds to each one of the pixels configuring the corresponding drawing region on the first scanned image based on a position matching result obtained by the position matching unit 260.

Then, the second difference calculation unit 269 calculates a difference of a pixel value (color value) of each one of the pixels configuring the corresponding drawing region on the first scanned image and a pixel value (color value) of the corresponding each one of the pixels identified on the reference image to calculate a difference of a color value for each one of the pixels configuring the corresponding drawing region on the first scanned image as color difference value for each one of the pixels configuring the corresponding drawing region on the first scanned image.

In this configuration, the color value of each pixel configuring the first scanned image and the color value of each pixel configuring the reference image are expressed by a value of one or more color channels such as RGB color channels. As to the first embodiment, since the first scanned image and the reference image are RGB image data, the color value of each one of pixels configuring the first scanned image and the color value of each one of pixels configuring the reference image are expressed by a pixel value defined by a value of each of RGB color channels. Therefore, the second difference calculation unit 269 calculates the difference of the color value (i.e., pixel value) of each one of the pixels configuring the first scanned image and the color value (i.e., pixel value) of each one of the pixels configuring the reference image at each of RGB color channels by calculating a difference of each of RGB values of each one of the pixels configuring the first scanned image and each of RGB values of each one of the pixels configuring the reference image.

The index color information acquisition unit 263 acquires the index color information from the index color information storage 257.

The first difference calculation unit 265 calculates a difference of the color value of the corresponding non-drawing region on the first scanned image and the color value of each of the plurality of index colors included in the index color information acquired by the index color information acquisition unit 263.

Specifically, the first difference calculation unit 265 calculates a difference of a color value of each one of the pixels configuring the corresponding non-drawing region on the first scanned image and a color value of each of the plurality of index colors included in the index color information acquired by the index color information acquisition unit 263 at each of color channels such as each of RGB color channels in the first embodiment.

For example, when a pixel "P" configuring the corresponding non-drawing region on the first scanned image has a color value (i.e., pixel value) indicated in FIG. 8, and the index color information indicated in FIG. 6 is applied, the first difference calculation unit 265 calculates a difference of the color value of the pixel "P" and the color value of each one of the index colors "D, E, and F" included in the index color information indicated in FIG. 6 at each of RGB color channels as illustrated in FIG. 9. In an example of FIG. 9, a section "S" indicates the total sum of the absolute value of a color difference value calculated at each of RGB color channel.

Figures 11, 12:
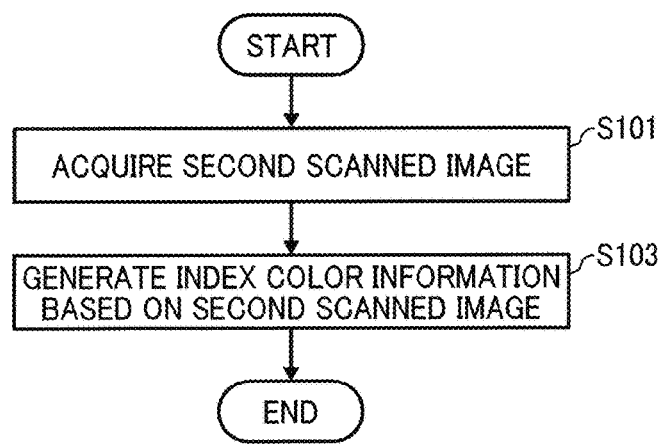
FIG. 11 illustrates an example of a difference of color value of the index color information indicated in FIG. 6 and another color value of a pixel indicated in FIG. 10.
FIG. 12 illustrates an example of a flowchart of the steps of a process of generating index color information in the print inspection system of the first embodiment.

Further, for example, when a pixel "Q" configuring the corresponding non-drawing region on the first scanned image has a color value (i.e., pixel value) indicated in FIG. 10, and the index color information indicated in FIG. 6 is applied, the first difference calculation unit 265 calculates a difference of the color value of the pixel "Q" and the color value of each one of the index colors "D, E, and F" included in the index color information indicated in FIG. 6 at each of RGB color channels as illustrated in FIG. 11. In an example of FIG. 11, a section "S" indicates the total sum of the absolute value of a color difference value calculated at each of RGB color channel.

As above described, when the first difference calculation unit 265 calculates the difference of the color value of an each target pixel (e.g., P, Q), configuring the corresponding non-drawing region on the first scanned image, and the color value of each one of the index colors included in the index color information, the difference of color value (i.e., color difference value) is calculated for the each target pixel (e.g., P, Q). Then, the determination unit 267 determines to select one calculated color difference value from a plurality of the color difference values (see FIGS. 9 and 11) calculated for the each target pixel (e.g., P, Q), in which the determination unit 267 determines which index color (e.g., colors D, E, F) and which color difference value is selected for the each target pixel (e.g., P, Q).

Specifically, the determination unit 267 determines to select the one calculated color difference value from the color difference values calculated for the each target pixel (e.g., P, Q) based on any one of a minimum value of the absolute value of the color difference value calculated at each of color channels, and a minimum value of the total sum of the absolute value of the color difference value calculated at each of color channels to determine which index color (e.g., color D, E, F) is selected to calculate the color difference value for the each target pixel (e.g., P, Q) configuring the corresponding non-drawing region on the first scanned image.

For example, as to the pixel "P" of FIG. 8, the difference of the color value of the pixel "P" and the color value of each of the index colors "D, E, and F" included in the index color information at each of color channels (e.g., color difference value at each of RGB color channels) can be calculated as illustrated in FIG. 9. In this example case, when the total sum of the absolute value of the color difference value calculated at each of RGB colors that becomes the minimum value is used to select the color difference value of the pixel "P," the index color "E" is illustrated in FIG. 9 is selected from the index colors "D, E, F" because the total sum of the absolute value of the color difference value calculated at each of RGB colors with respect to the index color "E" becomes the minimum value (e.g., 4). Therefore, the determination unit 267 selects the difference of the color value of the index color "E" and the color value of the pixel "P" as the color difference value of the pixel "P."

Further, for example, as to the pixel "Q" of FIG. 10, the difference of the color value of the pixel "Q" and the color value of each of the index colors "D, E, and F" included in the index color information at each of color channels (e.g., color difference value at each of RGB color channels) can be calculated as illustrated in FIG. 11. In this example case, when the total sum of the absolute value of the color difference value calculated at each of RGB colors that becomes the minimum value is used to select the color difference value of the pixel "Q," the index color "D" is illustrated in FIG. 11 is selected from the index colors "D, E, F" because the total sum of the absolute value of the color difference value calculated at each of RGB colors with respect to the index color "D" becomes the minimum value (e.g., 165). Therefore, the determination unit 267 selects the difference of the color value of the index color "D" and the color value of the pixel "Q" as the color difference value of the pixel "Q."

In the above described examples, the total sum of the absolute value of the color difference value calculated at each of RGB colors that becomes the minimum value is selected as the color difference value of the target pixel (e.g., P, Q) but not limited thereto. For example, when the absolute value of the difference of the color value of the target pixel (e.g., P, Q) and the color value of each of the index colors "D, E, and F" at each of the RGB color channels are calculated, the absolute value of the difference of the color value of the target pixel (e.g., P, Q) and the color value of R color channel, the absolute value of the difference of the color value of the target pixel (e.g., P, Q) and the color value of G color channel, and the absolute value of the difference of the color value of the target pixel (e.g., P, Q) and the color value of B can be compared among the index colors "D, E and F" included in the index color information, and then the minimum value of the absolute value of the difference of the color value of the target pixel (e.g., P, Q) calculated at any one of R, G, and B color channels of one of the index colors "D, E and F" can be selected as the color difference value for the target pixel (e.g., P, Q) Further, the above two rules can be both used to determine the color difference value of the target pixel (e.g., P, Q).

For example, as to the pixel "P" of FIG. 8, the difference of the color value of the pixel "P" and the color value of each of the index colors "D, E, and F" included in the index color information at each of RGB color channels can be calculated as illustrated in FIG. 9. In this case, the absolute value of the difference of the color value of the pixel "P" and the color value of G color channel of the index color "F" becomes the minimum value (e.g., 0) among the absolute value of the differences of the color value of the pixel "P" and the color value of other color channels of the index colors "D, E and F" as indicated in FIG. 9, in which the determination unit 267 determines to select the difference of the color value of the index color "F" and the color value of the pixel "P" as the color difference value of the pixel "P."

For example, as to the pixel "Q" of FIG. 10, the difference of the color value of the pixel "Q" and the color value of each of the index colors "D, E, and F" included in the index color information at each of RGB color channels can be calculated as illustrated in FIG. 11. In this case, the absolute value of the difference of the color value of the pixel "Q" and the color value of B color channel of the index color "E" becomes the minimum value (e.g., 1) among the absolute value of the differences of the color value of the pixel "Q" and the color value of other color channels of the index colors "D, E and F" as indicated in FIG. 11, in which the determination unit 267 determines to select the difference of the color value of the index color "E" and the color value of the pixel "Q" as the color difference value of the pixel "Q."

The integration unit 270 integrates the color difference value calculated by the second difference calculation unit 269 and the color difference value determined by the determination unit 267 to generate a difference image. Specifically, the integration unit 270 employs the color difference value calculated by the second difference calculation unit 269 as a pixel value for each one of the pixels configuring the corresponding drawing region on the first scanned image, and employs the color difference value determined by the determination unit 267 as a pixel value for each one of the pixels configuring corresponding non-drawing region on the first scanned image to generate the difference image.

The inspection unit 271 inspects the printed matter based on a plurality of color difference value values calculated by the first difference calculation unit 265. Specifically, the inspection unit 271 inspects the printed matter by inspecting each one of the pixels configuring the corresponding non-drawing region on the first scanned image based on the color difference value calculated with respect to each of color channels determined by the determination unit 267 for each one of the pixels configuring the corresponding non-drawing region on the first scanned image. The inspection unit 271 further inspects the printed matter by inspecting each one of the pixels configuring the corresponding drawing region on the first scanned image based on the color difference value calculated by the second difference calculation unit 269 for each one of the pixels configuring the corresponding drawing region on the first scanned image.

Specifically, the inspection unit 271 compares a threshold and the color difference value (i.e., pixel value) of each one of the pixels configuring the difference image generated by the integration unit 270 to inspect whether one or more defects exist on the printed matter printed by the printing apparatus 100. For example, a portion (i.e., pixel group) where the color difference value is greater than the threshold, and a greater area portion (i.e., pixel group) having a given color difference value can be inspected as the defect. Then, the inspection unit 271 stores an inspection result such as a position and a type of the defect, an inspected image, and the master image in a memory by associating these data with each other, and then transmits the inspection result to the printing apparatus 100 as feedback information.

FIG. 12 illustrates an example of a flowchart of the steps of a process of generating the index color information in the print inspection system 1 of the first embodiment.

At first, the scanned-image acquisition unit 253 acquires the second scanned image generated by scanning a recording medium used for generating the index color information by using the scan unit 251 (step S101).

Then, the index color information generation unit 255 generates the index color information including information of a plurality of index colors having higher frequency of occurrence on the recording medium by analyzing the second scanned image acquired by the scanned-image acquisition unit 253, and registers or stores the generated index color information in the index color information storage 257 (step S103).

Figure 13:
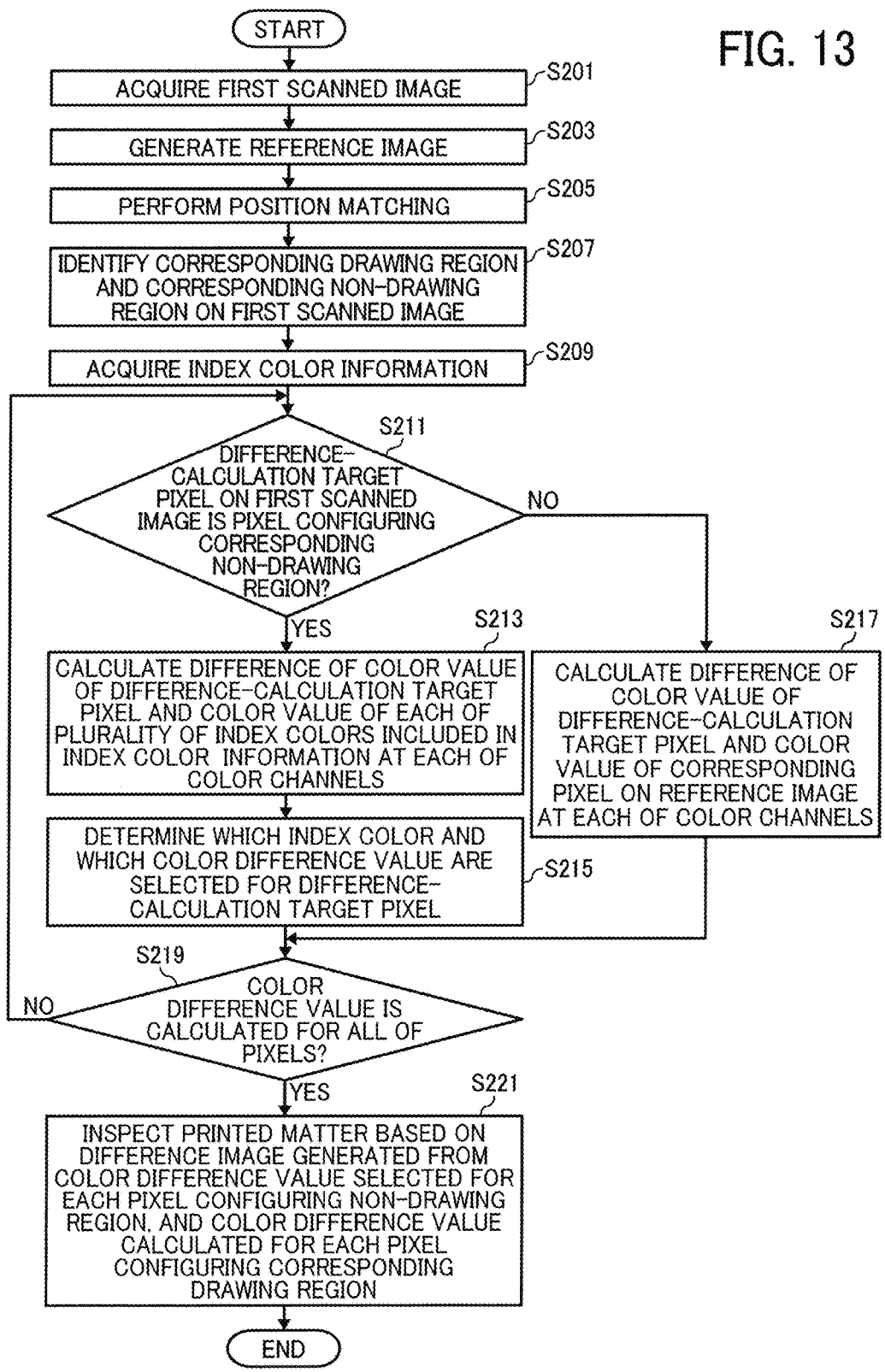
FIG. 13 illustrates an example of a flowchart of the steps of a process of inspecting a printed image in the print inspection system of the first embodiment.

FIG. 13 illustrates an example of a flowchart of the steps of a process of inspecting a printed image in the print inspection system 1 of the first embodiment.

At first, the scanned-image acquisition unit 253 acquires the first scanned image generated by scanning the printed matter by using the scan unit 251 (step S201).

Then, the reference image generation unit 259 acquires the RIP image transmitted from the printing apparatus 100 as the target drawing image, and generates the reference image based on the acquired RIP image, in which the reference image is generated as an inspection standard used for inspecting the drawing region on the printed matter where the target drawing image is drawn (step S203).

Then, the position matching unit 260 extracts one or more feature points from the reference image generated by the reference image generation unit 259, identifies one or more points on the first scanned image acquired by the scanned-image acquisition unit 253 that correspond to the one or more feature points on the reference image, calculates a positional deviation amount between the one or more feature points on the reference image and the corresponding one or more points identified on the first scanned image, and then performs the position matching between the reference image and the first scanned image based on the calculated positional deviation amount (step S205).

Then, the identifying unit 261 identifies the corresponding drawing region and the corresponding non-drawing region on the first scanned image acquired by the scanned-image acquisition unit 253 based a position matching result obtained by comparing the first scanned image and the reference image generated by the reference image generation unit 259 (step S207).

Then, the index color information acquisition unit 263 acquires the index color information from the index color information storage 257 (step S209).

Then, the identifying unit 261 checks whether a difference-calculation target pixel on the first scanned image is a pixel configuring the corresponding non-drawing region (step S211).

When the difference-calculation target pixel on the first scanned image is the pixel configuring the corresponding non-drawing region (step S211: YES), the first difference calculation unit 265 calculates a difference of a color value of each of the plurality of index colors included in the index color information, acquired by the index color information acquisition unit 263, and a color value of the difference-calculation target pixel at each of color channels such as each of RGB color channels (step S213).

Then, when the difference of the color value of the difference-calculation target pixel and the color value of each of the plurality of index colors included in the index color information is calculated at each of color channels (e.g., each of RGB color channels), the determination unit 267 determines which index color and which calculated color difference value are selected for determining the color difference value of the difference-calculation target pixel (step S215).

By contrast, when the difference-calculation target pixel on the first scanned image is not the pixel configuring the corresponding non-drawing region but the difference-calculation target pixel on the first scanned image is the pixel configuring the corresponding drawing region (step S211: NO), the second difference calculation unit 269 calculates a difference of the color value of the difference-calculation target pixel on the first scanned image and the color value of a pixel on the reference image, corresponding to the difference-calculation target pixel, at each of color channels such as each of RGB color channels (step S217).

The processing from steps S211 to S217 is repeated until the color difference value is calculated for all of pixels configuring the first scanned image (step S219: NO).

Then, when the color difference value is calculated for all of pixels configuring the first scanned image (step S219: YES), the integration unit 270 selects the color difference value calculated by the second difference calculation unit 269 as the pixel value for each one of the pixels configuring the corresponding drawing region on the first scanned image, and selects the color difference value determined by the determination unit 267 as the pixel value for each one of the pixels configuring the corresponding non-drawing region on the first scanned image to generate the difference image based on the selected color difference values, and then the inspection unit 271 inspects whether one or more defects exist on the printed matter exist based on the difference image generated by the integration unit 270 (step S221).

As to the above described first embodiment, the non-drawing region on the printed matter where the target drawing image is not drawn is inspected by using one or more index colors having higher frequency of occurrence on the recording media, in which the recording medium used for generating the index color information have the similar property of the recording media used for forming or printing images thereon as the printed matters. Therefore, even when the surface pattern of recording media (e.g., surface appearance pattern and/or concave/convex pattern of recording media) used for forming or printing images thereon as the printed matters vary for each one of the recording media, the printed image inspection in view of the surface pattern of the recording media can be performed effectively, with which deterioration of the printed image inspection accuracy can be prevented, and the image inspection can be performed with enhanced accuracy.

Specifically, as to the non-drawing region on the printed matter where the target drawing image is not drawn, among the plurality of index colors having higher frequency of occurrence on the recording medium, an index color having the least color difference value with respect to a color of the corresponding non-drawing region on the first scanned image is selected as the inspection standard for inspecting the printed matter. Therefore, since the non-drawing region on the printed matter is inspected by using the index color that is closer to the surface appearance pattern of the recording media used for forming the printed matters with higher probability, the printed image inspection in view of the surface appearance pattern of the recording media can be performed effectively, with which deterioration of the printed image inspection accuracy can be prevented, and the image inspection can be performed with enhanced accuracy.

As to the first embodiment, the above method is applied when the surface appearance pattern of the recording media vary for each one of recording sheets (e.g., shape and arrangement of surface appearance pattern vary for each one of recording sheets), but the above method can be also applied when the concave/convex pattern of recording media varies for each one of recording sheets (e.g., shape and arrangement of concave/convex pattern vary for each one of recording sheets). In this case too, the shape of shadows caused by the concave/convex pattern and arrangement of the concave/convex vary for each one of the recording sheets, but the printed image inspection in view of the shadows on the recording media caused by the concave/convex pattern can be performed effectively by applying the method of the first embodiment, with which deterioration of the printed image inspection accuracy can be prevented, and the image inspection can be performed with enhanced accuracy.

Variant Example

As a variant example of the first embodiment, the inspection unit 271 can set one threshold (second threshold) for inspecting the drawing region on a printed matter, and another threshold (first threshold) for inspecting the non-drawing region on the printed matter, in which the first threshold and the second threshold can be differently. In this configuration, the inspection unit 271 compares the first threshold and the color difference value determined at each of color channels for each one of the pixels configuring the corresponding non-drawing region to inspect whether the defect exists on the corresponding non-drawing region, and compares the second threshold and the color difference value calculated for each one of the pixels configuring the corresponding drawing region to inspect whether the defect exists on the corresponding drawing region.

The variant example can be effective to inspect the defect because the conspicuity of defect is different between the drawing region where the image is drawn and the non-drawing region where the image is not drawn when human eyes see the drawing region and the non-drawing region. Since the defect in the drawing region is less conspicuous than the defect in the non-drawing region, a value of the second threshold is preferably set greater than a value of the first threshold.

Further, in the non-drawing region on the printed matter, the smaller the number of surface appearance patterns in the non-drawing region on the printed matter, the more conspicuous the defect is (i.e., the greater the number of surface appearance patterns in the non-drawing region on the printed matter, the less conspicuous the defect is). Therefore, a value of the first threshold can be set greater as the number of index colors having higher frequency of occurrence on the recording medium, used for generating the index color information, becomes greater.

Second Embodiment

In the above described first embodiment, it is assumed that the surface pattern of the recording medium is not seen or observed through the drawing region on the printed matter. However, when an adhered amount of toner or ink is small and/or when colorant having given properties is used, the surface pattern of the recording medium may be seen through the drawing region, with which the printed image inspection accuracy may deteriorate.

In view of this issue, a description is given of a configuration to cope with a situation when the surface pattern of the recording medium is seen through the drawing region formed on the printed matter in a second embodiment. In the following description, the description of the different points from the first embodiment is mainly described, and the names and references of the second embodiment having the same functions in the first embodiment are denoted with the same names and references of the first embodiment, and thereby the description thereof is omitted.

Figure 14:
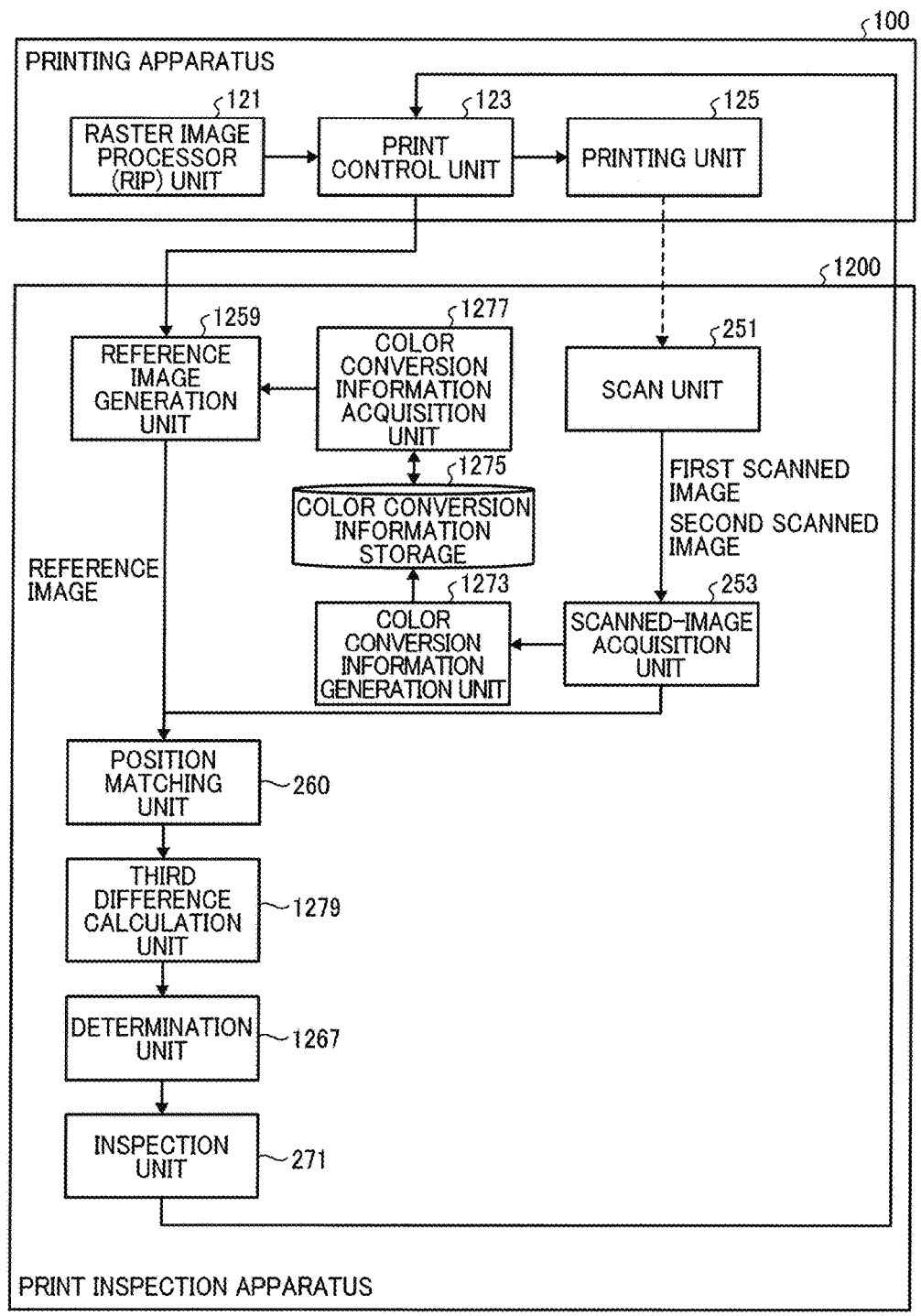
FIG. 14 illustrates an example of a functional block diagram of a printing apparatus and a print inspection apparatus of a second embodiment.

FIG. 14 illustrates an example of a functional block diagram of the printing apparatus 100 and a print inspection apparatus 1200 of the second embodiment. As illustrated in FIG. 14, the print inspection apparatus 1200 includes, for example, a reference image generation unit 1259, a determination unit 1267, a color conversion information generation unit 1273, a color conversion information storage 1275, a color conversion information acquisition unit 1277, and a third difference calculation unit 1279, which are different from the first embodiment.

At first, a description is given of the different points of a process of generating color conversion information in the second embodiment compared to the process of generating the index color information in the first embodiment.

Figures 15, 16:
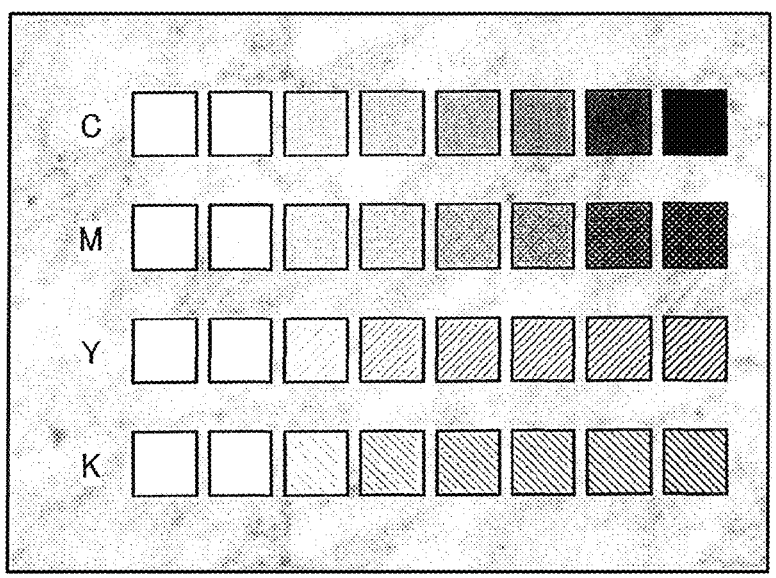
FIG. 15 illustrates an example of a recording medium used for generating color conversion information in the second embodiment.
FIG. 16 illustrates an example of color conversion information of the second embodiment.

In the second embodiment, a color chart is formed or printed on a recording medium used for generating the index color information as illustrated in FIG. 15. In the second embodiment, the recording medium used for generating the index color information has a substantially similar property of recording media used for printing an image thereon while the recording medium used for generating the index color information is printed with the color chart as illustrated in FIG. 15.

Figure 2:
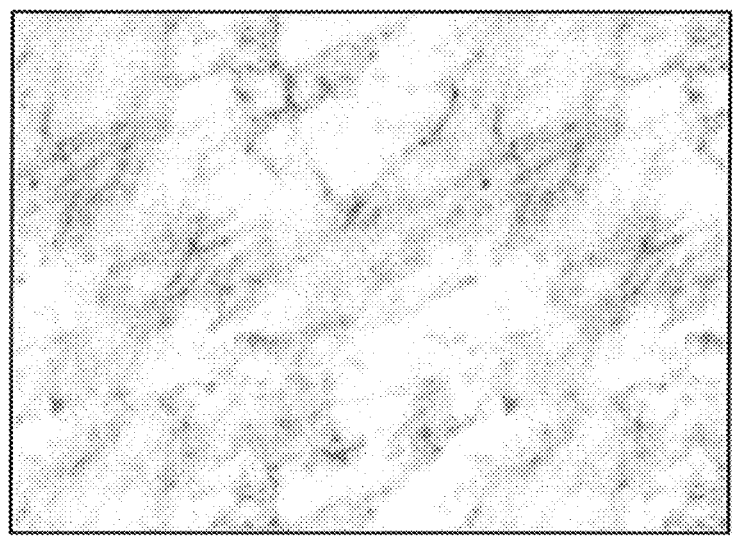
FIG. 2 illustrates an example of a recording medium used in the first embodiment.

For example, the recording medium used for generating the index color information is a recording sheet having the surface pattern illustrated in FIG. 2 and printed with the color chart indicated in FIG. 15. Specifically, the color chart includes a plurality of color patches for each of CMYK colors. In an example case of FIG. 15, eight color patches, set with different density levels changed in eight levels from 0% to 100%, are set for each of CMYK colors, and thereby the total of 32 color patches are set for the color chart, but the number of color patches is not limited thereto.

By analyzing the second scanned image acquired by the scanned-image acquisition unit 253, the color conversion information generation unit 1273 generates color conversion information for each of the plurality of index colors having higher frequency of occurrence on the recording medium, used for generating the index color information, by associating a value of each of the plurality of color patches set for the color chart with the plurality of index colors, and registers the generated color conversion information in the color conversion information storage 1275 (see FIG. 16).

Specifically, the color conversion information generation unit 1273 generates the index color information described in the first embodiment for each region on the second scanned image corresponding to each one of the color patches configuring the color chart printed on the recording medium, used for generating the index color information, and associates the index color information generated by using the method of the first embodiment and the color of each one of the color patches with each other to generate the color conversion information. For example, when the recording medium used for generating the index color information is printed with the color chart having 32 color patches as illustrated in FIG. 15, the color conversion information generation unit 1273 generates the index color information indicated in FIG. 6 for each one of the 32 color patches, and associates CMYK color of each one of the color patches and the index color information (i.e., RGB colors of a plurality of index colors) indicated in FIG. 6 to generate the color conversion information.

Since it is difficult to print color patches on the color chart to cover the entire range of CMYK colors, the RGB color corresponding to missing CMYK colors is supplemented by performing an interpolation calculation.

In this configuration, a first CMYK color has a first color patch and a second CMYK color has a second color patch, and then one CMYK color (c, m, y, k) not having a color patch exists between the first CMYK color and the second CMYK color, in which two gradations of CMYK color exist for the CMYK color (c, m, y, k) for each of CMYK color channels, which means 16 ($2^4$) colors exist. As to the second embodiment, RGB colors corresponding to the CMYK colors (c, m, y, k) not having the color patches can be calculated by using 16 colors.

For example, any one color of CMYK colors not having a color patch is set as color "T," RGB color corresponding to the color "T" is set as "Ti (Ri, Gi, Bi)," RGB colors corresponding to the first CMYK color having the color patch is set as color "Tn (Rn, Gn, Bn)," and RGB colors corresponding to the second CMYK color having the color patch is set as color "Tm (Rm, Gm, Bm)," in which "n" is set smaller than "m" (n<m), and the CMYK color not having the color patch exists between the first CMYK color and the second CMYK color. In this case, color "Ti (Ri, Gi, Bi)" can be calculated by using the following formulas (1) to (3).

$$Ri=Rn+(Rm-Rn)\times(Ti-Tn)/(Tm-Tn) \quad (1)$$

$$Gi=Gn+(Gm-Gn)\times(Ti-Tn)/(Tm-Tn) \quad (2)$$

$$Bi=Bn+(Bm-Bn)\times(Ti-Tn)/(Tm-Tn) \quad (3)$$

The above calculation is repeated in the order of MKCY to calculate RGB colors corresponding to the CMYK colors not having the color patches by interpolating from 16 points to 8 points (M), from 8 points to 4 points (K), from 4 points to 2 points (C), and from 2 points to 1 point (Y).

Further, the interpolation method of the RGB colors corresponding to the missing CMYK colors is not limited thereto. Further, in the second embodiment, the interpolation of RGB colors corresponding to the missing CMYK colors is performed when registering the color conversion information, but not limited thereto. For example, the interpolation is not performed when registering the color conversion information but the interpolation of RGB colors corresponding to the missing CMYK colors can be performed when the color conversion information is to be used.

FIG. 16 illustrates an example of the color conversion information generated in the second embodiment. In an example of FIG. 16, three index colors of "D, E and F" expressed by RGB colors and having higher frequency of occurrence on the recording medium used for generating the index color information are associated with each of CMYK colors.

Hereinafter, a description is given of the different points of the inspection process in the second embodiment compared to the inspection process in the first embodiment.

The color conversion information acquisition unit 1277 acquires the color conversion information from the color conversion information storage 1275.

As to the color conversion processing in the second embodiment, the reference image generation unit 1259 performs the color conversion processing by applying the color conversion information acquired by the color conversion information acquisition unit 1277. In this configuration, a reference image is generated for each of the index colors having higher frequency of occurrence on the recording medium used for generating the index color information, and thereby a plurality of reference images is generated.

For example, when the color conversion is performed by applying the color conversion information illustrated in FIG. 16, the reference image generation unit 1259 generates the reference image for each of index colors "D, E and F," and thereby a plurality of reference images is generated.

The position matching unit 260 performs the position matching same as the first embodiment, in which the position matching unit 260 performs the position matching of the first scanned image and each of the reference images.

The third difference calculation unit 1279 calculates a difference of a color value of each one of the pixels configuring the first scanned image and a color value of each one of pixels configuring each of the plurality of reference images, corresponding to each one of the pixels configuring the first scanned image. Specifically, the third difference calculation unit 1279 calculates the difference of the color value of each one of the pixels configuring the first scanned image and the color value of each one of the pixels configuring each of the plurality of reference images, corresponding to each one of the pixels configuring the first scanned image, at each of color channels such as each of RGB color channels in the second embodiment, in which a plurality of color difference values is calculated for each one of the pixels configuring the first scanned image.

When the plurality of color difference values is calculated is calculated for each one of the pixels configuring the first scanned image, the determination unit 1267 determines which color difference value calculated for which reference image is selected for a target pixel configuring the first scanned image from the plurality of color difference values calculated from the color value of each one of the pixels configuring the first scanned image and the color value of each one of the pixels configuring each of the plurality of reference images.

Specifically, the determination unit 1267 determines which color difference value calculated for which reference image is selected for the target pixel configuring the first scanned image based on any one of a minimum value of an absolute value of the color difference value calculated at each of the color channels, and a minimum value of the total sum of an absolute value of the color difference value calculated at each of the color channels.

Then, the determination unit 1267 applies the determined color difference value as the pixel value for each one of the pixels configuring the first scanned image to generate a difference image.

The inspection unit 271 inspects the printed matter by inspecting each one of the pixels configuring the first scanned image based on the color difference value calculated for each one of the pixels configuring the first scanned image. Specifically, the inspection unit 271 inspects the printed matter based on the color difference value determined by the determination unit 1267 for each one of the pixels configuring the first scanned image at each of color channels. More specifically, the inspection unit 271 compares a threshold and the color difference value (i.e., pixel value) calculated for each one of the pixels configuring the generated difference image to inspect whether one or more defects exist on the printed matter generated by the printing apparatus 100.

Figure 17:
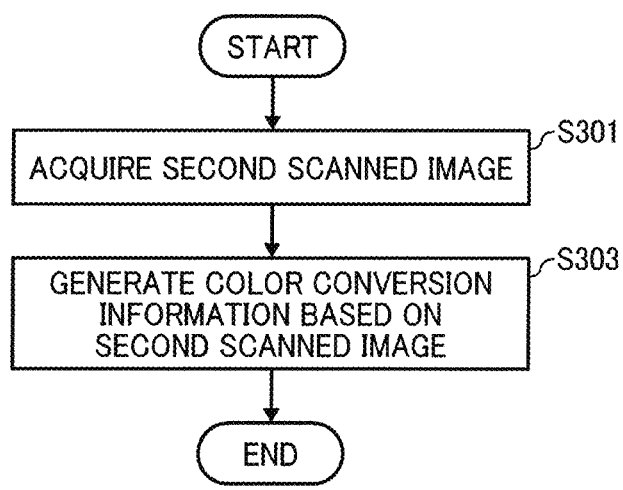
FIG. 17 illustrates an example of a flowchart of the steps of a process of generating color conversion information in a print inspection system of the second embodiment.

FIG. 17 illustrates an example of a flowchart of the steps of a process of generating the color conversion information in the print inspection system of the second embodiment.

At first, the scanned-image acquisition unit 253 acquires the second scanned image generated by scanning the recording medium used for generating the index color information by using the scan unit 251 (step S301).

Then, by analyzing the second scanned image acquired by the scanned-image acquisition unit 253, the color conversion information generation unit 1273 generates color conversion information for each of the plurality of index colors having higher frequency of occurrence on the recording medium, used for generating the index color information, by associating a value of each of the plurality of color patches set for the color chart with the plurality of index colors, and registers the generated color conversion information in the color conversion information storage 1275 (step S303).

Figure 18:
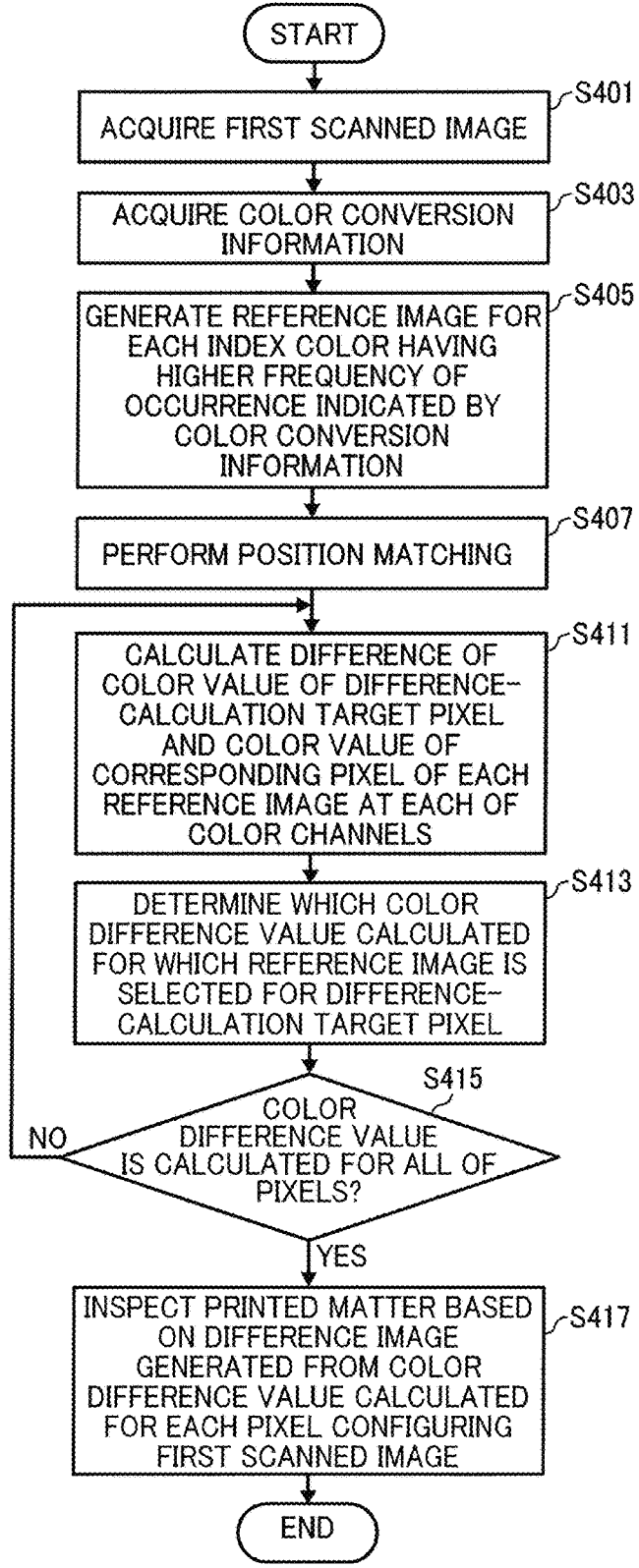
FIG. 18 illustrates an example of a flowchart of the steps of a process of inspecting a printed image in a print inspection system of the second embodiment.

FIG. 18 illustrates an example of a flowchart of the steps of a process of inspecting a printed image in the print inspection system of the second embodiment.

At first, the scanned-image acquisition unit 253 acquires the first scanned image generated by scanning the printed matter by using the scan unit 251 (step S401).

Then, the color conversion information acquisition unit 1277 acquires the color conversion information from the color conversion information storage 1275 (step S403).

Then, the reference image generation unit 1259 acquires the RIP image transmitted from the printing apparatus 100 as the target drawing image, generates the reference image used as the inspection standard for inspecting the printed matter for each of the index colors having higher frequency of occurrence on the recording medium, used for generating the index color information, based on the acquired RIP image and the color conversion information acquired by the color conversion information acquisition unit 1277 (step S405), in which a plurality of reference images is generated.

Then, the position matching unit 260 performs the position matching of the first scanned image and each of the reference images generated by the reference image generation unit 1259 (step S407).

Then, the third difference calculation unit 1279 calculates a difference of the color value of the difference-calculation target pixel on the first scanned image and the color value of each one of pixels of each of a plurality of reference images, corresponding to the difference-calculation target pixel on the first scanned image, at each of color channels such as each of RGB color channels in the second embodiment (step S411), in which a plurality of color difference values is calculated.

Then, when the plurality of color difference values is calculated for each one of the pixels configuring the first scanned image, the determination unit 1267 determines which color difference value calculated for which reference image is selected for the difference-calculation target pixel configuring the first scanned image from the plurality of color difference values calculated from the color value of each one of the pixels configuring the first scanned image and the color value of each one of the pixels configuring each of the plurality of reference images (step S413).

The processing from steps S411 to S413 is repeated until the color difference value is calculated for all of pixels configuring the first scanned image (step S415: NO). Then, when the color difference value is calculated for all of pixels configuring the first scanned image (step S415: YES), the inspection unit 271 inspects whether one or more defects exist on the printed matter based on the difference image generated by the determination unit 1267 (step S417).

As to the above described second embodiment, the reference image is generated for each of the index colors having higher frequency of occurrence on the recording medium used for generating the index color information, which has the substantially similar property of the recording media used for forming the printed matters, and then the inspection is performed by using the reference image generated for each of the index colors having higher frequency of occurrence. Therefore, even when the surface pattern of recording media used for forming the printed matters (e.g., surface appearance pattern and concave/convex pattern of recording media) varies for each one of recording media, and the surface pattern of the recording media is seen through the drawing region formed on the printed matters, the printed image inspection in view of the surface pattern of the recording media can be performed effectively, with which deterioration of the printed image inspection accuracy can be prevented, and the image inspection can be performed with enhanced accuracy.

Further, the variant example of the first embodiment can be also applied to the second embodiment. Specifically, in the second embodiment too, the inspection unit 271 can set one threshold (second threshold) for inspecting the drawing region on a printed matter, and another threshold (first threshold) for inspecting the non-drawing region on the printed matter, in which the first threshold and the second threshold can be set differently. In this case too, when the identifying unit 261 that identifies the drawing region and the non-drawing region on the first scanned image is included in the second embodiment, the variant example of the first embodiment can be also applied to the second embodiment.

Program

One or more programs executed by the print inspection apparatus in each of the above described embodiments and variant examples can be stored in a computer-readable storage medium such as a compact disk read only memory (CD-ROM), a compact disk recordable (CD-R), a memory card, a digital versatile disk (DVD), a flexible disk (FD), or the like with an installable or executable format.

Further, the one or more programs executed by the print inspection apparatus in each of the above embodiments and variant examples can be stored in a computer connected to a network such as the Internet, and provided by downloading from the computer via a network. Further, the one or more programs executed by the print inspection apparatus in each of the above embodiments and variant examples can be provided or distributed through a network such as the Internet. Further, the one or more programs executed by the print inspection apparatus in each of the above embodiments and the variant examples can be provided in a read only memory (ROM) or the like in advance.

Further, the one or more programs executed by the print inspection apparatus in each of the above embodiments and variant examples can be implemented as one or modules to implement the above-described each unit on the computer. In actual hardware configuration, for example, the CPU reads the one or more programs from the ROM and loads on the RAM to execute the one or more programs to implement the above described functions on the computer. Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

As to the above described one or more embodiments of the inspection apparatus, the inspection method, and the storage medium, even when the surface pattern of recording media used for forming printed matters varies for each one of the recording media, deterioration of the printed image inspection accuracy can be prevented, and the image inspection can be performed with enhanced accuracy.

In the above described first embodiment, the inspection apparatus includes the following configurations. For example, as to the above described first embodiment, the inspection apparatus includes circuitry to acquire a first scanned image by scanning each recording media printed with a target image as a printed matter using a scanner, the printed matter including a drawing region where the target image is drawn, and a non-drawing region where the target image is not drawn; acquire a second scanned image by scanning one recording medium printed with a color chart including a plurality of color patches using the scanner without printing the target image on the one recording medium, the one recording medium and the each recording media having a similar property; generate index color information including information of a plurality of index colors having higher frequency of occurrence on the one recording medium for each of the plurality of color patches configuring the color chart printed on the one recording medium; generate color conversion information by associating a value of each of the plurality of color patches and a color value of each of the plurality of index colors included in the index color information; generate a reference image as an inspection standard for inspecting the printed matter for each of the plurality of index colors having higher frequency of occurrence by performing a color conversion of the target image by applying the color conversion information, the generated reference image including a plurality of reference images; calculate a difference of a color value of each one of pixels configuring the first scanned image and a color value of each one of pixels of each of the plurality of reference images, corresponding to each one of the pixels configuring the first scanned image, as a color difference value of each one of the pixels configuring the first scanned image, the calculated color difference value includes a plurality of color difference values; and inspect the printed matter based on the plurality of color difference values calculated for the pixels configuring the first scanned image.

Further, as to the inspection apparatus of the above described first embodiment, the color value of each one of pixels configuring the first scanned image and the color value of each one of pixels configuring each of the plurality of reference images are expressed by a color value of one or more color channels. The circuitry calculates the difference of the color value of each one of the pixels configuring the first scanned image and the color value of each one of the pixels configuring each of the plurality of reference images, corresponding to each one of the pixels configuring the first scanned image, at each of the color channels, as a color difference value of each one of the pixels configuring the first scanned image, the calculated color difference value includes a plurality of color difference values. When the plurality of color difference values is calculated, the circuitry determines which color difference value calculated for which reference image is selected for each one of the pixels configuring the first scanned image from the plurality of color difference values calculated from the color value of each one of the pixels configuring the first scanned image and the color value of each one of the pixels configuring each of the plurality of reference images. The circuitry inspects the printed matter by checking each one of the pixels configuring the first scanned image based on the color difference value determined for each one of the pixels configuring the first scanned image.

Further, as to the inspection apparatus of the above described first embodiment, the circuitry determines which color difference value calculated for which reference image is selected for each one of the pixels configuring the first scanned image based on any one of a minimum value of an absolute value of the color difference value calculated at each of the color channels, and a minimum value of the total sum of an absolute value of the color difference value calculated at each of the color channels.

Further, as to the inspection apparatus of the above described first embodiment, the circuitry generates the reference image used as an inspection standard for inspecting the drawing region where the target image is drawn on the printed matter by processing the target image, the circuitry calculates a difference of a color value of each one of pixels configuring a corresponding drawing region on the first scanned image, and a color value of each one of pixels on the reference image corresponding to each one of the pixels on the corresponding drawing region on the first scanned image, and the circuitry inspects the printed matter based on the color difference value calculated for each one of the pixels configuring the corresponding drawing region on the first scanned image.

Further, as to the inspection apparatus of the above described first embodiment, the circuitry compares a first threshold and the color difference value determined for each one of the pixels configuring the corresponding non-drawing region on the first scanned image, corresponding to the non-drawing region on the printed matter where the target image is not drawn, at each of the color channels to inspect whether a defect exists on the corresponding non-drawing region on the first scanned image, and the circuitry compares a second threshold and the color difference value calculated for each one of the pixels configuring the corresponding drawing region on the first scanned image, corresponding to the drawing region on the printed matter where the target image is drawn, to inspect whether a defect exists on the corresponding drawing region on the first scanned image.

Further, as to the inspection apparatus of the above described first embodiment, the first threshold is set greater as the number of index colors having higher frequency of occurrence on the one recording medium becomes greater.

Further, as to the inspection apparatus of the above described first embodiment, the reference image is configured with the plurality of pixels, each set with a color. Each of the plurality of pixels configuring the reference image corresponds to a pixel configuring the drawing region or a pixel configuring the non-drawing region on the reference image, and the circuitry identifies the corresponding drawing region and the corresponding non-drawing region on the first scanned image by comparing the first scanned image and the reference image.

Further, as to the inspection apparatus of the above described first embodiment, the circuitry acquires the second scanned image generated by scanning the one recording medium, and analyzes the second scanned image to generate the index color information including the information of the plurality of index colors.

In the above described first embodiment, the method of inspecting a printed matter includes the following configurations.

For example, as to the above described first embodiment, the method of inspecting a printed matter includes acquiring a first scanned image by scanning each recording media printed with a target image as a printed matter using a scanner, the printed matter including a drawing region where the target image is drawn, and a non-drawing region where the target image is not drawn; acquiring a second scanned image by scanning one recording medium using the scanner without printing the target image on the one recording medium, the one recording medium and the each recording media having a similar property; acquiring index color information including information of a plurality of index colors having higher frequency of occurrence on the one recording medium by analyzing the second scanned image; identifying a corresponding drawing region on the first scanned image, corresponding to the drawing region on the printed matter, and a corresponding non-drawing region on the first scanned image, corresponding to the non-drawing region on the printed matter, by comparing the first scanned image and a reference image generated from the target image; calculating a difference of a color value of the corresponding non-drawing region on the first scanned image, corresponding to the non-drawing region on the printed matter, and a color value of each of the plurality of index colors included in the index color information as a color difference value of the corresponding non-drawing region on the first scanned image, the calculated color difference value of the corresponding non-drawing region including a plurality of color difference values; and inspecting the printed matter based on at least one of the plurality of color difference values.

In the above described first embodiment, the storage medium includes the following configuration. For example, as to the above described first embodiment, the non-transitory storage medium stores one or more instructions that, when executed by one or more processors, cause the one or more processors to execute a method of inspecting a printed matter. The method includes acquiring a first scanned image by scanning each recording media printed with a target image as a printed matter using a scanner, the printed matter including a drawing region where the target image is drawn, and a non-drawing region where the target image is not drawn; acquiring a second scanned image by scanning one recording medium using the scanner without printing the target image on the one recording medium, the one recording medium and the each recording media having a similar property; acquiring index color information including information of a plurality of index colors having higher frequency of occurrence on the one recording medium by analyzing the second scanned image; identifying a corresponding drawing region on the first scanned image, corresponding to the drawing region on the printed matter, and a corresponding non-drawing region on the first scanned image, corresponding to the non-drawing region on the printed matter, by comparing the first scanned image and a reference image generated from the target image; calculating a difference of a color value of the corresponding non-drawing region on the first scanned image, corresponding to the non-drawing region on the printed matter, and a color value of each of the plurality of index colors included in the index color information as a color difference value of the corresponding non-drawing region on the first scanned image, the calculated color difference value of the corresponding non-drawing region including a plurality of color difference values; and inspecting the printed matter based on at least one of the plurality of color difference values.

As to the above described second embodiment, the inspection apparatus includes circuitry to acquire a first scanned image by scanning each recording media printed with a target image as a printed matter using a scanner, the printed matter including a drawing region where the target image is drawn, and a non-drawing region where the target image is not drawn; acquire a second scanned image by scanning one recording medium printed with a color chart including a plurality of color patches using the scanner without printing the target image on the one recording medium, the one recording medium and the each recording media having a similar property; generate index color information including information of a plurality of index colors having higher frequency of occurrence on the one recording medium for each of the plurality of color patches configuring the color chart printed on the one recording medium; generate color conversion information by associating a value of each of the plurality of color patches and a color value of each of the plurality of index colors included in the index color information; generate a reference image as an inspection standard for inspecting the printed matter for each of the plurality of index colors having higher frequency of occurrence by performing a color conversion of the target image by applying the color conversion information, the generated reference image including a plurality of reference images; calculate a difference of a color value of each one of pixels configuring the first scanned image and a color value of each one of pixels of each of the plurality of reference images, corresponding to each one of the pixels configuring the first scanned image, as a color difference value of each one of the pixels configuring the first scanned image, the calculated color difference value includes a plurality of color difference values; and inspect the printed matter based on the plurality of color difference values calculated for the pixels configuring the first scanned image.

Further, as to the inspection apparatus of the above described second embodiment, the color value of each one of pixels configuring the first scanned image and the color value of each one of pixels configuring each of the plurality of reference images are expressed by a color value of one or more color channels. The circuitry calculates the difference of the color value of each one of the pixels configuring the first scanned image and the color value of each one of the pixels configuring each of the plurality of reference images, corresponding to each one of the pixels configuring the first scanned image, at each of the color channels, as a color difference value of each one of the pixels configuring the first scanned image, the calculated color difference value includes a plurality of color difference values. When the plurality of color difference values is calculated, the circuitry determines which color difference value calculated for which reference image is selected for each one of the pixels configuring the first scanned image from the plurality of color difference values calculated from the color value of each one of the pixels configuring the first scanned image and the color value of each one of the pixels configuring each of the plurality of reference images. The circuitry inspects the printed matter by checking each one of the pixels configuring the first scanned image based on the color difference value determined for each one of the pixels configuring the first scanned image.

Further, as to the inspection apparatus of the above described second embodiment, the circuitry determines which color difference value calculated for which reference image is selected for each one of the pixels configuring the first scanned image based on any one of a minimum value of an absolute value of the color difference value calculated at each of the color channels, and a minimum value of the total sum of an absolute value of the color difference value calculated at each of the color channels.

Further, as to the inspection apparatus of the above described second embodiment, the circuitry compares a first threshold and the color difference value determined for each one of pixels configuring a corresponding non-drawing region on the first scanned image, corresponding to the non-drawing region on the printed matter where the target image is not drawn, to inspect whether a defect exists on the corresponding non-drawing region on the first scanned image, and the circuitry compares a second threshold and the color difference value calculated for each one of pixels configuring a corresponding drawing region on the first scanned image, corresponding to the drawing region on the printed matter where the target image is drawn, to inspect whether a defect exists on the corresponding drawing region on the first scanned image.

Further, as to the inspection apparatus of the above described second embodiment, the first threshold is set greater as the number of index colors having higher frequency of occurrence on the one recording medium becomes greater.

Further, as to the inspection apparatus of the above described second embodiment, the reference image is configured with the plurality of pixels, each set with a color. Each of the plurality of pixels configuring the reference image corresponds to a pixel configuring the drawing region or a pixel configuring the non-drawing region on the reference image, and the circuitry identifies the corresponding drawing region and the corresponding non-drawing region on the first scanned image by comparing the first scanned image and the reference image.

Further, as to the inspection apparatus of the above described second embodiment, the circuitry acquires the second scanned image generated by scanning the one recording medium printed with the color chart, and analyzes the second scanned image to generate the color conversion information with a plurality of numbers.

In the above described second embodiment, the method of inspecting a printed matter includes the following configuration. For example, as to the above described second embodiment, the inspection method includes acquiring a first scanned image by scanning each recording media printed with a target image as a printed matter using a scanner, the printed matter including a drawing region where the target image is drawn, and a non-drawing region where the target image is not drawn; acquiring a second scanned image by scanning one recording medium printed with a color chart including a plurality of color patches using the scanner without printing the target image on the one recording medium, the one recording medium and the each recording media having a similar property; generating index color information including information of a plurality of index colors having higher frequency of occurrence on the one recording medium for each of the plurality of color patches configuring the color chart printed on the one recording medium; generating color conversion information by associating a value of each of the plurality of color patches and a color value of each of the plurality of index colors included in the index color information; generating a reference image as an inspection standard for inspecting the printed matter for each of the plurality of index colors having higher frequency of occurrence by performing a color conversion of the target image by applying the color conversion information, the generated reference image including a plurality of reference images; calculating a difference of a color value of each one of pixels configuring the first scanned image and a color value of each one of pixels of each of the plurality of reference images, corresponding to each one of the pixels configuring the first scanned image, as a color difference value of each one of the pixels configuring the first scanned image, the calculated color difference value includes a plurality of color difference values; and inspecting the printed matter based on the plurality of color difference values calculated for the pixels configuring the first scanned image.

In the above described second embodiment, the storage medium includes the following configuration. For example, as to the above described second embodiment, the non-transitory storage medium stores one or more instructions that, when executed by one or more processors, cause the one or more processors to execute a method of inspecting a printed matter. The method includes acquiring a first scanned image by scanning each recording media printed with a target image as a printed matter using a scanner, the printed matter including a drawing region where the target image is drawn, and a non-drawing region where the target image is not drawn; acquiring a second scanned image by scanning one recording medium printed with a color chart including a plurality of color patches using the scanner without printing the target image on the one recording medium, the one recording medium and the each recording media having a similar property; generating index color information including information of a plurality of index colors having higher frequency of occurrence on the one recording medium for each of the plurality of color patches configuring the color chart printed on the one recording medium; generating color conversion information by associating a value of each of the plurality of color patches and a color value of each of the plurality of index colors included in the index color information; generating a reference image as an inspection standard for inspecting the printed matter for each of the plurality of index colors having higher frequency of occurrence by performing a color conversion of the target image by applying the color conversion information, the generated reference image including a plurality of reference images; calculating a difference of a color value of each one of pixels configuring the first scanned image and a color value of each one of pixels of each of the plurality of reference images, corresponding to each one of the pixels configuring the first scanned image, as a color difference value of each one of the pixels configuring the first scanned image, the calculated color difference value includes a plurality of color difference values; and inspecting the printed matter based on the plurality of color difference values calculated for the pixels configuring the first scanned image.

Numerous additional modifications and variations of the above embodiments and the variant examples are possible in light of the above teachings. It is therefore to be understood that within the scope of the appended claims, the disclosure of the present invention may be practiced otherwise than as specifically described herein. For example, elements and/or features of different examples and illustrative embodiments may be combined each other and/or substituted for each other within the scope of present disclosure and appended claims.

What is claimed is:

1. An inspection apparatus comprising:
   circuitry to
   acquire a first scanned image by scanning each recording media printed with a target image as a printed matter using a scanner, the printed matter including a drawing region where the target image is drawn, and a non-drawing region where the target image is not drawn;
   acquire a second scanned image by scanning one recording medium printed with a color chart including a plurality of color patches using the scanner without printing the target image on the one recording medium, the one recording medium and the each recording media having a similar property;
   generate index color information including information of a plurality of index colors having higher frequency of occurrence on the one recording medium for each of the plurality of color patches configuring the color chart printed on the one recording medium;
   generate color conversion information by associating a value of each of the plurality of color patches and a color value of each of the plurality of index colors included in the index color information;

generate a reference image as an inspection standard for inspecting the printed matter for each of the plurality of index colors having higher frequency of occurrence by performing a color conversion of the target image by applying the color conversion information, the generated reference image including a plurality of reference images;

calculate a difference of a color value of each one of pixels configuring the first scanned image and a color value of each one of pixels of each of the plurality of reference images, corresponding to each one of the pixels configuring the first scanned image, as a color difference value of each one of the pixels configuring the first scanned image, the calculated color difference value includes a plurality of color difference values; and inspect the printed matter based on the plurality of color difference values calculated for the pixels configuring the first scanned image.

2. The inspection apparatus of claim 1,
wherein the color value of each one of pixels configuring the first scanned image and the color value of each one of pixels configuring each of the plurality of reference images are expressed by a color value of one or more color channels, wherein the circuitry calculates the difference of the color value of each one of the pixels configuring the first scanned image and the color value of each one of the pixels configuring each of the plurality of reference images, corresponding to each one of the pixels configuring the first scanned image, at each of the color channels, as a color difference value of each one of the pixels configuring the first scanned image, the calculated color difference value includes a plurality of color difference values, wherein, when the plurality of color difference values is calculated, the circuitry determines which color difference value calculated for which reference image is selected for each one of the pixels configuring the first scanned image from the plurality of color difference values calculated from the color value of each one of the pixels configuring the first scanned image and the color value of each one of the pixels configuring each of the plurality of reference images, wherein the circuitry inspects the printed matter by checking each one of the pixels configuring the first scanned image based on the color difference value determined for each one of the pixels configuring the first scanned image.

3. The inspection apparatus of claim 2, wherein the circuitry determines which color difference value calculated for which reference image is selected for each one of the pixels configuring the first scanned image based on any one of a minimum value of an absolute value of the color difference value calculated at each of the color channels, and a minimum value of the total sum of an absolute value of the color difference value calculated at each of the color channels.

4. The inspection apparatus of claim 1,
wherein the circuitry compares a first threshold and the color difference value determined for each one of pixels configuring a corresponding non-drawing region on the first scanned image, corresponding to the non-drawing region on the printed matter where the target image is not drawn, to inspect whether a defect exists on the corresponding non-drawing region on the first scanned image, wherein the circuitry compares a second threshold and the color difference value calculated for each one of pixels configuring a corresponding drawing region on the first scanned image, corresponding to the drawing region on the printed matter where the target image is drawn, to inspect whether a defect exists on the corresponding drawing region on the first scanned image.

5. The inspection apparatus of claim 4, wherein the first threshold is set greater as the number of index colors having higher frequency of occurrence on the one recording medium becomes greater.

6. The inspection apparatus of claim 4,
wherein the reference image is configured with the plurality of pixels, each set with a color,
wherein each of the plurality of pixels configuring the reference image corresponds to a pixel configuring the drawing region or a pixel configuring the non-drawing region on the reference image,
wherein the circuitry identifies the corresponding drawing region and the corresponding non-drawing region on the first scanned image by comparing the first scanned image and the reference image.

7. The inspection apparatus of claim 1, wherein the circuitry acquires the second scanned image generated by scanning the one recording medium printed with the color chart, and analyzes the second scanned image to generate the color conversion information with a plurality of numbers.

8. A method of inspecting a printed matter comprising:
acquiring a first scanned image by scanning each recording media printed with a target image as a printed matter using a scanner, the printed matter including a drawing region where the target image is drawn, and a non-drawing region where the target image is not drawn;

acquiring a second scanned image by scanning one recording medium printed with a color chart including a plurality of color patches using the scanner without printing the target image on the one recording medium, the one recording medium and the each recording media having a similar property;

generating index color information including information of a plurality of index colors having higher frequency of occurrence on the one recording medium for each of the plurality of color patches configuring the color chart printed on the one recording medium;

generating color conversion information by associating a value of each of the plurality of color patches and a color value of each of the plurality of index colors included in the index color information;

generating a reference image as an inspection standard for inspecting the printed matter for each of the plurality of index colors having higher frequency of occurrence by performing a color conversion of the target image by applying the color conversion information, the generated reference image including a plurality of reference images;

calculating a difference of a color value of each one of pixels configuring the first scanned image and a color value of each one of pixels of each of the plurality of reference images, corresponding to each one of the pixels configuring the first scanned image, as a color difference value of each one of the pixels configuring the first scanned image, the calculated color difference value includes a plurality of color difference values; and inspecting the printed matter based on the plurality of color difference values calculated for the pixels configuring the first scanned image.

9. A non-transitory storage medium storing one or more instructions that, when executed by one or more processors, cause the one or more processors to execute a method of inspecting a printed matter, the method comprising:

acquiring a first scanned image by scanning each recording media printed with a target image as a printed matter using a scanner, the printed matter including a drawing region where the target image is drawn, and a non-drawing region where the target image is not drawn;

acquiring a second scanned image by scanning one recording medium printed with a color chart including a plurality of color patches using the scanner without printing the target image on the one recording medium, the one recording medium and the each recording media having a similar property;

generating index color information including information of a plurality of index colors having higher frequency of occurrence on the one recording medium for each of the plurality of color patches configuring the color chart printed on the one recording medium;

generating color conversion information by associating a value of each of the plurality of color patches and a color value of each of the plurality of index colors included in the index color information;

generating a reference image as an inspection standard for inspecting the printed matter for each of the plurality of index colors having higher frequency of occurrence by performing a color conversion of the target image by applying the color conversion information, the generated reference image including a plurality of reference images;

calculating a difference of a color value of each one of pixels configuring the first scanned image and a color value of each one of pixels of each of the plurality of reference images, corresponding to each one of the pixels configuring the first scanned image, as a color difference value of each one of the pixels configuring the first scanned image, the calculated color difference value includes a plurality of color difference values; and inspecting the printed matter based on the plurality of color difference values calculated for the pixels configuring the first scanned image.

\* \* \* \* \*